United States Patent
Sternby et al.

(10) Patent No.: US 12,549,950 B2
(45) Date of Patent: Feb. 10, 2026

(54) FEATURE ENGINEERING FOR MACHINE LEARNING IN A WIRELESS COMMUNICATION NETWORK

(71) Applicant: TELEFONAKTIEBOLAGET LM ERICSSON (PUBL), Stockholm (SE)

(72) Inventors: Jakob Sternby, Lund (SE); Ikram Ullah, Thuwal (SA); Prajwol Kumar Nakarmi, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 338 days.

(21) Appl. No.: 18/286,174

(22) PCT Filed: Mar. 29, 2022

(86) PCT No.: PCT/IB2022/052913
§ 371 (c)(1),
(2) Date: Oct. 9, 2023

(87) PCT Pub. No.: WO2022/214914
PCT Pub. Date: Oct. 13, 2022

(65) Prior Publication Data
US 2024/0205679 A1    Jun. 20, 2024

Related U.S. Application Data

(60) Provisional application No. 63/172,914, filed on Apr. 9, 2021.

(51) Int. Cl.
*H04W 24/10* (2009.01)
*H04W 12/121* (2021.01)
*H04W 64/00* (2009.01)

(52) U.S. Cl.
CPC ......... *H04W 12/121* (2021.01); *H04W 24/10* (2013.01); *H04W 64/003* (2013.01)

(58) Field of Classification Search
None
See application file for complete search history.

(56) References Cited

U.S. PATENT DOCUMENTS

| | | | |
|---|---|---|---|
| 2019/0068443 A1* | 2/2019 | Li | H04L 41/0816 |
| 2022/0078099 A1* | 3/2022 | Zhohov | H04W 24/02 |

FOREIGN PATENT DOCUMENTS

| | | |
|---|---|---|
| WO | 2022008384 A1 | 1/2022 |

OTHER PUBLICATIONS

Apostolo et al., "Feature selection on database optimization for Wi-Fi fingerprint indoor positioning", Procedia Computer Science, Elsevier, Jan. 1, 2019, pp. 251-260, vol. 159.

(Continued)

*Primary Examiner* — Idowu O Osifade
(74) *Attorney, Agent, or Firm* — Weisberg I.P. Law, P.A.

(57) ABSTRACT

A method performed by feature engineering equipment comprises obtaining a first dataset that comprises datapoints for features of the first dataset, wherein the features of the first dataset include cell-specific features that are specific to respective cells in a wireless communication network, wherein each datapoint of the first dataset comprises one or more cell-specific sets that are specific to one or more respective cells, wherein each cell-specific set includes one or more values for one or more respective cell-specific features that are specific to the same cell. The method further comprises forming, from the first dataset, a second dataset that comprises datapoints for features of the second dataset, and providing the second dataset, or a derivative of the second dataset, to model training equipment for training a machine learning model or to inference-making equipment for making an inference.

20 Claims, 22 Drawing Sheets

(56) References Cited

OTHER PUBLICATIONS

Liu et al., "WiFi0Sensing Based Person-to-Person Distance Estimation Using Deep Learning", 2018 IEEE 24th International Conference on Parallel and Distributed Systems(ICPADS), Dec. 11, 2018, pp. 236-243.
Machaj et al., "Rank Based Fingerprinting Algorithm for Indoor Positioning", Indoor Positioning and Indoor Navigation (IPIN), 2011 International Conference on, IEEE, Sep. 21, 2011, pp. 1-6.
Nakarmi et al., "Detecting false base stations in mobile networks", Ericsson blogpost, 2018.
Nakarmi et al., "Murat: Multi-RAT False Base Station Detector", Ericsson Research Security, 13 pages, Feb. 17, 2021, https://arxiv.org/abs/2102.08780.
Rezgui et al., "An Efficient Normalized Rank Based SVM for Room Level Indoor WiFi Localization with Diverse Devices", Hindawi, Mobile Information Systems, Jan. 1, 2017, pp. 1-9, vol. 2017.
Saccomanno et al., "Let's Forget About Exact Signal Strength; Indoor Positioning based on Access Point Ranking and Recurrent Neural Networks", 2020 The 9th International Conference on Networks, Communication and Computing, Acmpub27. Dec. 7, 2020, pp. 215-224.
Sternby et al., "Anomaly Detection Forest", ECAI 2020, IOS Press, 2020.
Yang et al., "Regularized Cycle Consistent Generative Adversarial Network for Anomaly Detection", 24th European Conference on Artificial Intelligence—ECAI 2020, 2020, Santiago de Compostela, Spain.

* cited by examiner

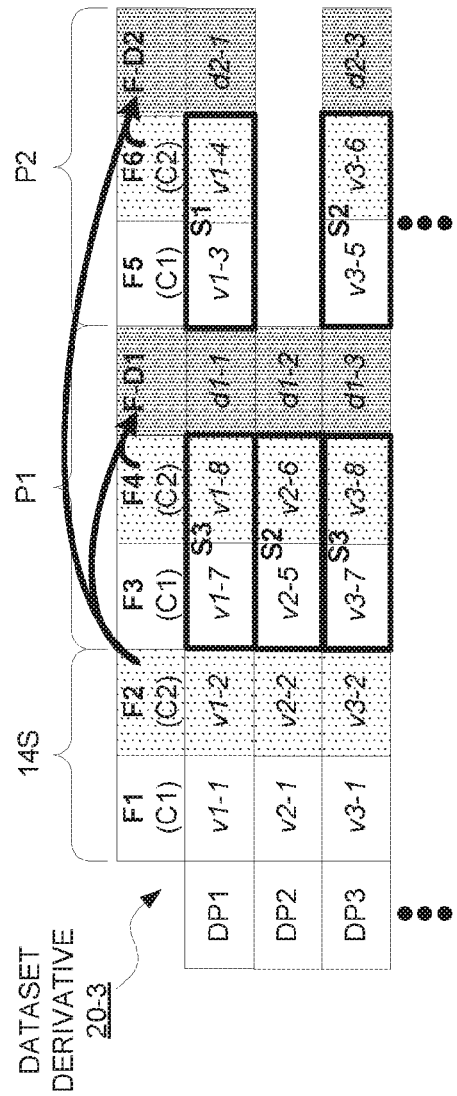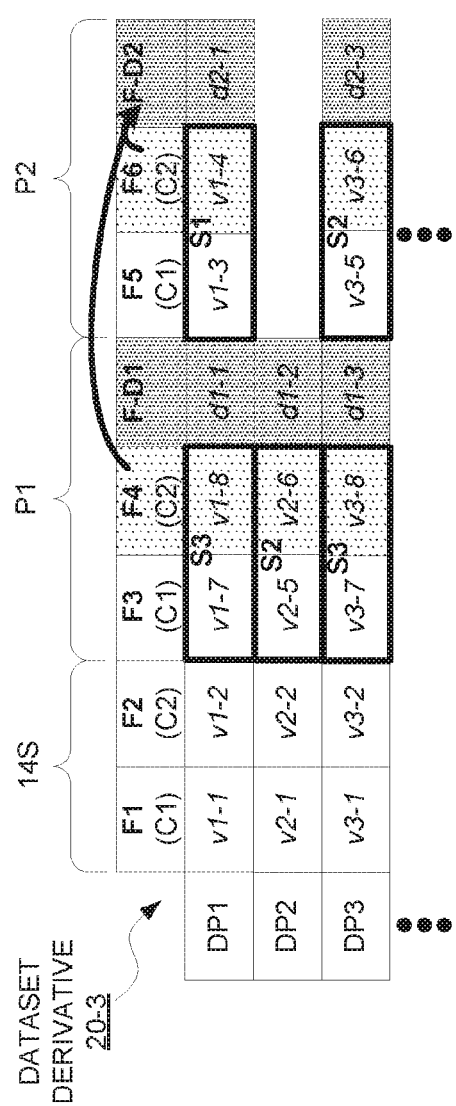
FIGURE 6C
FIGURE 6D

FEATURE ENGINEERING FOR MACHINE LEARNING IN A WIRELESS COMMUNICATION NETWORK

PRIORITY CLAIM

This application is a national stage application of International Patent Application No. PCT/IB2022/052913, filed Mar. 29, 2022, which claims priority to U.S. Provisional Application No. 63/172,914, Apr. 9, 2021, the disclosure disclosures of which are hereby incorporated in their entirety by reference.

TECHNICAL FIELD

The present application relates generally to a wireless communication network and relates more particularly to feature engineering for machine learning in such a network.

BACKGROUND

A wireless device can be configured by a wireless communication network to provide the network with measurements of neighbour cells, e.g., to facilitate handovers, enable Self-Organizing Network (SON) features, and the like. These measurement reports can also be used to detect false cells that masquerade as genuine cells in order to maliciously eavesdrop on and/or track wireless devices. For example, when a wireless device sends a measurement report that reports detection of a cell with a certain cell identity, the network can check whether the reported cell identity is valid by checking whether the reported identity is included in a list of identities used by the network. If the reported identity is absent from the list so as to be an invalid identity, this anomaly may indicate the presence of a false cell.

Challenges nonetheless exist in detecting the presence of a false cell that is using a valid cell identity. A resourceful attacker may for instance scan the network to identify a cell identity being used in the network, and then operate its false cell with that valid cell identity. False cell detection in this case proves more complicated.

Using machine learning for detecting this or other types of anomalies in a wireless communication network requires considerable memory and processing resources, e.g., to process measurement reports, train a machine learning model, and use the trained model to detect an anomaly. The considerable memory and processing resources increases with the number of valid cell identities in the network, since the datasets usable for machine learning scale with this number of valid cell identities.

SUMMARY

Some embodiments herein exploit feature engineering to form a dataset that is more suitable for machine learning, e.g., for detecting an anomaly in a wireless communication network. Such feature engineering may for example reduce the dimensionality of the dataset's feature space so as to require fewer memory and processing resources for machine learning. Moreover, some embodiments achieve reduced feature dimensionality while also increasing discriminatory power, meaning that using the formed dataset for machine learning results in improved accuracy, precision, and recall for machine learning applications. Some embodiments herein therefore provide high discriminatory power in a compact feature set, with lower footprint.

More particularly in this regard, some embodiments herein include a method performed by feature engineering equipment. As shown, the method comprises obtaining a first dataset that comprises datapoints for features of the first dataset. The features of the first dataset include cell-specific features that are specific to respective cells in a wireless communication network. Each datapoint of the first dataset comprises one or more cell-specific sets that are specific to one or more respective cells. In some embodiments, each cell-specific set includes one or more values for one or more respective cell-specific features that are specific to the same cell. The method as shown also comprises determining, for each datapoint of the first dataset, a datapoint-specific ordering of one or more cell-specific sets of the datapoint. The method further comprises forming, from the first dataset, a second dataset that comprises datapoints for features of the second dataset. Features of the second dataset include ordinal-position-specific features that are specific to respective ordinal positions in the datapoint-specific orderings.

In some embodiments, the method also comprises providing the second dataset, or a derivative of the second dataset, to model training equipment for training a machine learning model or to inference-making equipment for making an inference.

BRIEF DESCRIPTION OF THE DRAWINGS

Figure (FIG.) 1 shows a wireless communication network 10 according to some embodiments.

FIG. 6C shows examples of derived features being combined feature formed from a combination of other features.

FIG. 6D shows an example of a derived feature being a combined feature formed from a combination of other features that are ordinal-position-specific features.

DETAILED DESCRIPTION

The disclosed subject matter is described below with reference to various embodiments. These embodiments are presented as teaching examples and are not to be interpreted as limiting the scope of the disclosed subject matter.

Figure 1:
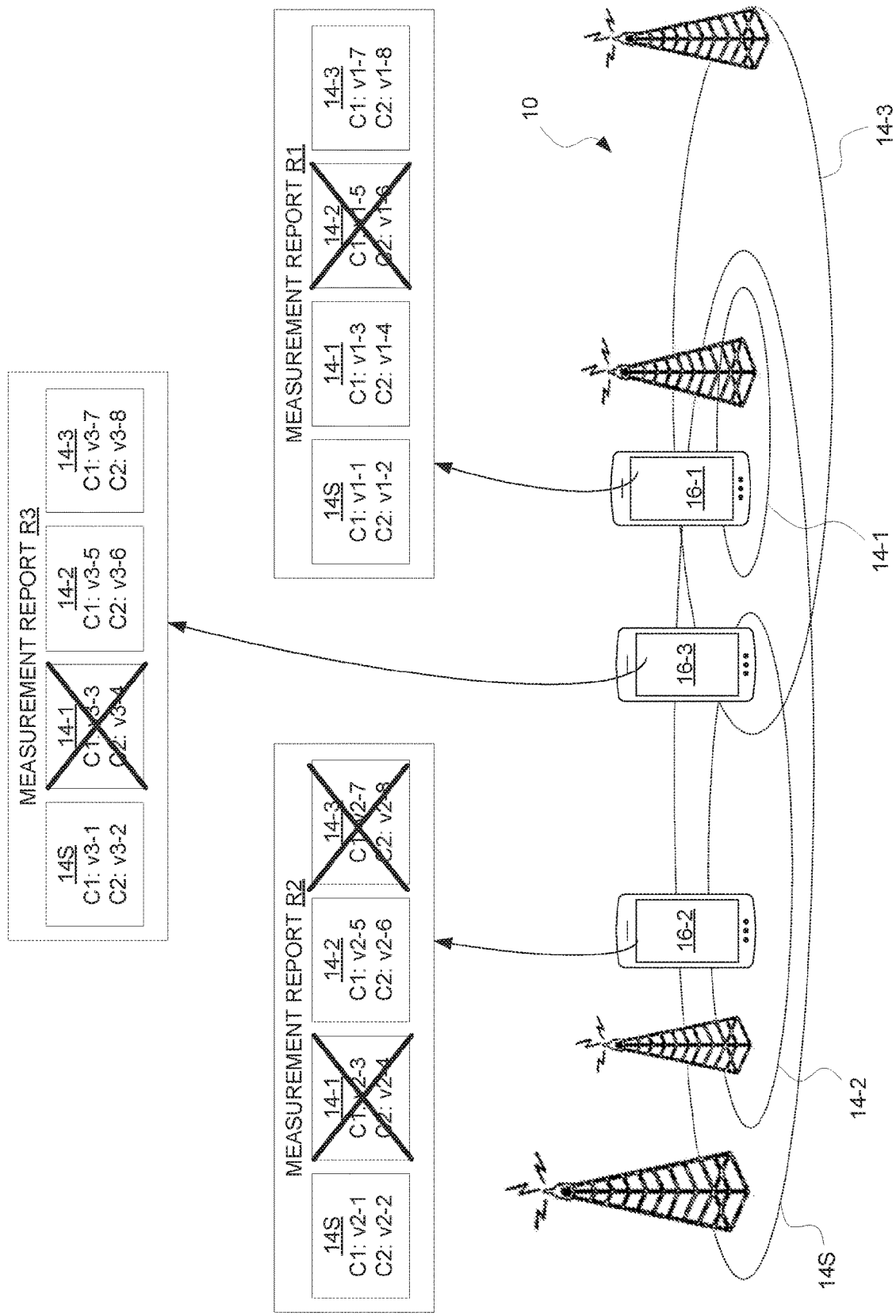

FIG. 1 shows a wireless communication network 10 according to some embodiments. As shown, the wireless communication network 10 includes radio network equipment (e.g., base stations) that provide radio coverage for respective cells 14S, 14-1, 14-2, and 14-3 of the wireless communication network 10. The cells 14S, 14-1, 14-2, and 14-3 may use respective cell identities, e.g., in the form of respective Physical Cell Identities (PCIs) or Cell Global Identities (CGIs), to distinguish themselves on a on a local or global basis. Wireless communication signals may for example be transmitted or received in association with a certain cell identity in order be associated with a certain cell which is assigned that certain cell identity.

In the example of FIG. 1, cell 14S serves each of the wireless communication devices 16-1, 16-2, and 16-3. The other cells 14-1, 14-2, and 14-3 are thereby neighbor cells of the serving cell 14S, i.e., in the sense that those cells neighbor the serving cell 14S from a radio coverage perspective. But, even though all of the wireless communication devices 16-1, 16-2, and 16-3 are within the coverage area of the serving cell 14S, the wireless communication devices 16-1, 16-2, and 16-3 are within the coverage area of different sets of neighbor cells 14-1, 14-2, and 14-3. Indeed, wireless communication device 16-1 is within the coverage area of neighbor cells 14-1 and 14-3, wireless communication device 16-2 is within the coverage area of only neighbor cell 14-2, and wireless communication device 16-3 is within the coverage area of neighbor cells 14-2 and 14-3.

In this context, to assist the wireless communication network 10 with mobility decisions about which cell should serve which wireless communication device at any given time, or for other reasons, the wireless communication devices 16-1, 16-2, and 16-3 each report to the wireless communication network 10 information about which cells the wireless communication device is within the radio coverage of, e.g., at a given time. In particular, the wireless communication devices 16-1, 16-2, and 16-3 each measure, and report to the wireless communication network 10, the value(s) that the wireless communication device detects for characteristic(s) associated with any cell(s) which the wireless communication device is within the coverage of.

In the example of FIG. 1, for instance, wireless communication device 16-1 transmits to the wireless communication network 10 measurement report R1. This measurement report R1 reports measurements for the serving cell 14S as well as neighbor cells 14-1 and 14-3, since the wireless communication device 16-1 is within the coverage area of those cells 14S, 14-1, and 14-3.

In particular, the measurement report R1 reports that the wireless communication device 16-1 detected value v1-1 for a first characteristic C1 associated with serving cell 14S and detected value v1-2 for a second characteristic C2 associated with the serving cell 14S, e.g., where the first characteristic C1 may be signal strength, such as Reference Signal Received Power (RSRP), and where the second characteristic C2 may be signal quality, such as Reference Signal Received Quality (RSRQ). Additionally, the measurement report R1 reports that the wireless communication device 16-1 detected value v1-3 for the first characteristic C1 associated with neighbor cell 14-1 and value v1-4 for the second characteristic C2 associated with neighbor cell 14-1. Furthermore, the measurement report R1 reports that the wireless communication device 16-1 detected value v1-7 for the first characteristic C1 associated with neighbor cell 14-3 and value v1-8 for the second characteristic C2 associated with neighbor cell 14-3. Note that the measurement report R1 does not report any values detected for the characteristics C1, C2 associated with neighbor cell 14-2, since the wireless communication device 16-1 is not within the coverage area of that neighbor cell 14-2.

Similarly, wireless communication device 16-2 transmits to the wireless communication network 10 measurement report R2. This measurement report R2 reports measurements for the serving cell 14S as well as neighbor cell 14-2, since the wireless communication device 16-2 is within the coverage area of those cells 14S and 14-2.

In particular, the measurement report R2 reports that the wireless communication device 16-2 detected value v2-1 for the first characteristic C1 associated with serving cell 14S and detected value v2-2 for the second characteristic C2 associated with the serving cell 14S. Additionally, the measurement report R2 reports that the wireless communication device 16-2 detected value v2-5 for the first characteristic C1 associated with neighbor cell 14-2 and value v2-6 for the second characteristic C2 associated with neighbor cell 14-2. Note that the measurement report R2 does not report any values detected for the characteristics C1, C2 associated with neighbor cell 14-1 or neighbor cell 14-3, since the wireless communication device 16-2 is not within the coverage area of either of those neighbors cell 14-1, 14-3.

Finally, wireless communication device 16-3 transmits to the wireless communication network 10 measurement report R3. This measurement report R3 reports measurements for the serving cell 14S as well as neighbor cells 14-2 and 14-3, since the wireless communication device 16-3 is within the coverage area of those cells 14S, 14-2, and 14-3.

In particular, the measurement report R3 reports that the wireless communication device 16-3 detected value v3-1 for the first characteristic C1 associated with serving cell 14S and detected value v3-2 for the second characteristic C2 associated with the serving cell 14S. Additionally, the measurement report R3 reports that the wireless communication device 16-3 detected value v3-5 for the first characteristic C1 associated with neighbor cell 14-2 and value v3-6 for the second characteristic C2 associated with neighbor cell 14-2. Furthermore, the measurement report R3 reports that the wireless communication device 16-3 detected value v3-7 for the first characteristic C1 associated with neighbor cell 14-3 and value v3-8 for the second characteristic C2 associated with neighbor cell 14-3. Note that the measurement report R3 does not report any values detected for the characteristics C1, C2 associated with neighbor cell 14-1, since the wireless communication device 16-3 is not within the coverage area of that neighbor cell 14-1.

Embodiments herein use these measurement reports R1, R2, and R3 for machine learning, e.g., for detecting an anomaly in the wireless communication network 10. To that end, feature extraction is performed on these measurement reports R1, R2, and R3 in order to obtain a dataset 20-1, shown in FIG. 2. The dataset 20-1 may also be referred to as a feature matrix. Regardless, the dataset 20-1 represents data from the measurement reports R1, R2, and R3 in terms of values for respective features F1-F8.

The dataset 20-1 in this regard has a number of features F1-F8. Each feature shown represents a characteristic (C1 or C2) reported for a certain cell. Specifically, features F1 and F2 respectively represent the first and second characteristics C1 and C2 associated with cell 14S. Features F3 and F4 respectively represent the first and second characteristics C1 and C2 associated with cell 14-1. Features F5 and F6 respectively represent the first and second characteristics C1 and C2 associated with cell 14-2. And features F7 and F8 respectively represent the first and second characteristics C1 and C2 associated with cell 14-3. Generally, then, the features F1-F8 shown are cell-specific because they are each specific to respective cells in the wireless communication network 10. Features F1 and F2 are each specific to cell 14S, features F3 and F4 are each specific to cell 14-1, features F5 and F6 are each specific to cell 14-2, and features F7 and F8 are each specific to cell 14-3.

In this context, the dataset 20-1 comprises datapoints DP1, DP2, and DP3 for these features F1-F8 of the dataset 20-1. Each datapoint DP1, DP2, and DP3 represents a respective measurement report R1, R2, and R3 that reported values detected for at least some of the cell-specific features F1-F8.

Datapoint DP1, for example, represents measurement report R1. Datapoint DP1 therefore includes a set S0 of values v1-1 and v1-2 respectively reported for features F1 and F2 that are specific to cell 14S, a set S1 of values v1-3 and v1-4 respectively reported for features F3 and F4 that are specific to cell 14-1, and a set S3 of values v1-7 and v1-8 respectively reported for features F7 and F8 that are specific to cell 14-3. Since measurement report R1 did not report any values for cell 14-2, datapoint DP1 correspondingly does not include a set S2 of values for features specific to cell 14-2.

Similarly, datapoint DP2 represents measurement report R2. Datapoint DP1 thereby includes a set S0 of values v2-1 and v2-2 respectively reported for features F1 and F2 that are specific to cell 14S, and a set S2 of values v2-5 and v2-6 respectively reported for features F5 and F6 that are specific to cell 14-2. Since measurement report R2 did not report any values for cell 14-1 or cell 14-3, datapoint DP2 correspondingly does not include a set S1 of values for features specific to cell 14-1 and does not include a set S3 of values for features specific to cell 14-3.

Finally, datapoint DP3 represents measurement report R3. Datapoint DP3 accordingly includes a set S0 of values v3-1 and v3-2 respectively reported for features F1 and F2 that are specific to cell 14S, a set S2 of values v3-5 and v3-6 respectively reported for features F5 and F6 that are specific to cell 14-2, and a set S3 of values v3-7 and v3-8 respectively reported for features F7 and F8 that are specific to cell 14-3. Since measurement report R3 did not report any values for cell 14-1, datapoint DP3 does not include a set S1 of values for features specific to cell 14-1.

Generally, then, each datapoint DP1, DP2, and DP3 comprises one or more cell-specific sets S0-S3, where each cell-specific set includes one or more values for one or more respective cell-specific features that are specific to the same cell. Notably, though, in some embodiments, at least some of the datapoints DP1, DP2, and DP3 differ in terms of the cell(s) to which their cell-specific sets are specific. For example, datapoint DP1's cell-specific sets S0, S1, and S3 are respectively specific to cells 14S, 14-1, and 14-3, whereas DP2's cell-specific sets S0 and S2 are respectively specific to cells 14S and 14-2. That is, unlike datapoint DP2, datapoint DP1 does not have any cell-specific set that is specific to cell 14-2. And, unlike datapoint DP1, datapoint DP2 does not have any cell-specific set that is specific to cell 14-1 or cell 14-3. This is attributable to the fact that the measurement reports R1, R2, and R3 differ in terms of for which cells they report values.

In fact, in some embodiments where there are many cells, the dataset 20-1 is sparse in the sense that, for each datapoint, the number of cell-specific sets for which the datapoint has values is less than the number of cell-specific sets for which the datapoint lacks values, e.g., each datapoint may have values for no more than 6 cell-specific sets out of hundreds of cell-specific sets in the dataset 20-1. In this case, the dataset 20-1 as a whole has a disproportionality large number of features (i.e., a large feature space or dimensionality) compared to the number of features for which each datapoint has values. Directly using this dataset 20-1 in machine learning would therefore require meaningful memory and processing resources, which would more or less scale with the number features of the dataset 20-1.

Figure 3:
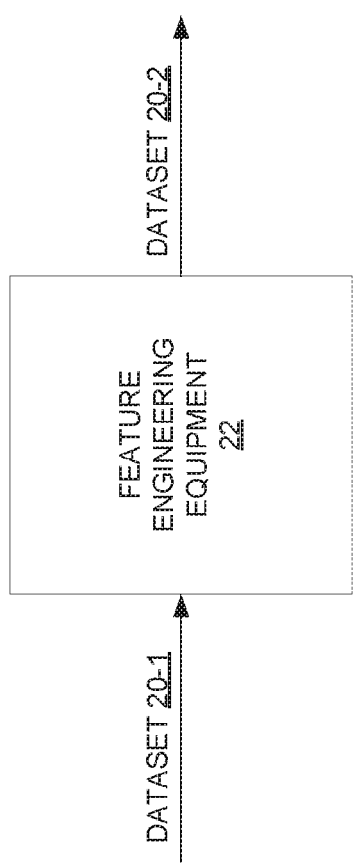
FIG. 3 shows feature engineering equipment according to some embodiments.

In these and other cases, embodiments herein exploit feature engineering equipment 22 shown in FIG. 3. As depicted, feature engineering equipment 22 performs feature engineering on the dataset 20-1 in order to form another dataset 20-2. Dataset 20-1 will accordingly be referred to as the first dataset 20-1, and dataset 20-2 will be referred to as the second dataset 20-2 or the formed dataset 20-2. This second dataset 20-2 may advantageously be more suitable for machine learning. For example, the number of features of the second dataset 20-2 may be less than the number of features of the first dataset 20-1, i.e., so as to achieve reduced dimensionality of the feature space. In fact, as the number of features for each cell increases (i.e., as the size of each cell-specific set increases), the reduction in feature dimensionality increases. This reduced feature dimensionality means that using the second dataset 20-2 for machine learning advantageously requires fewer memory and processing resources than using the first dataset 20-1. Moreover, some embodiments achieve reduced feature dimensionality while also increasing discriminatory power, meaning that using the second dataset 20-2 for machine learning results in improved accuracy, precision, and recall for machine learning applications. Some embodiments herein therefore provide high discriminatory power in a compact feature set, with lower footprint.

Figure 4A:
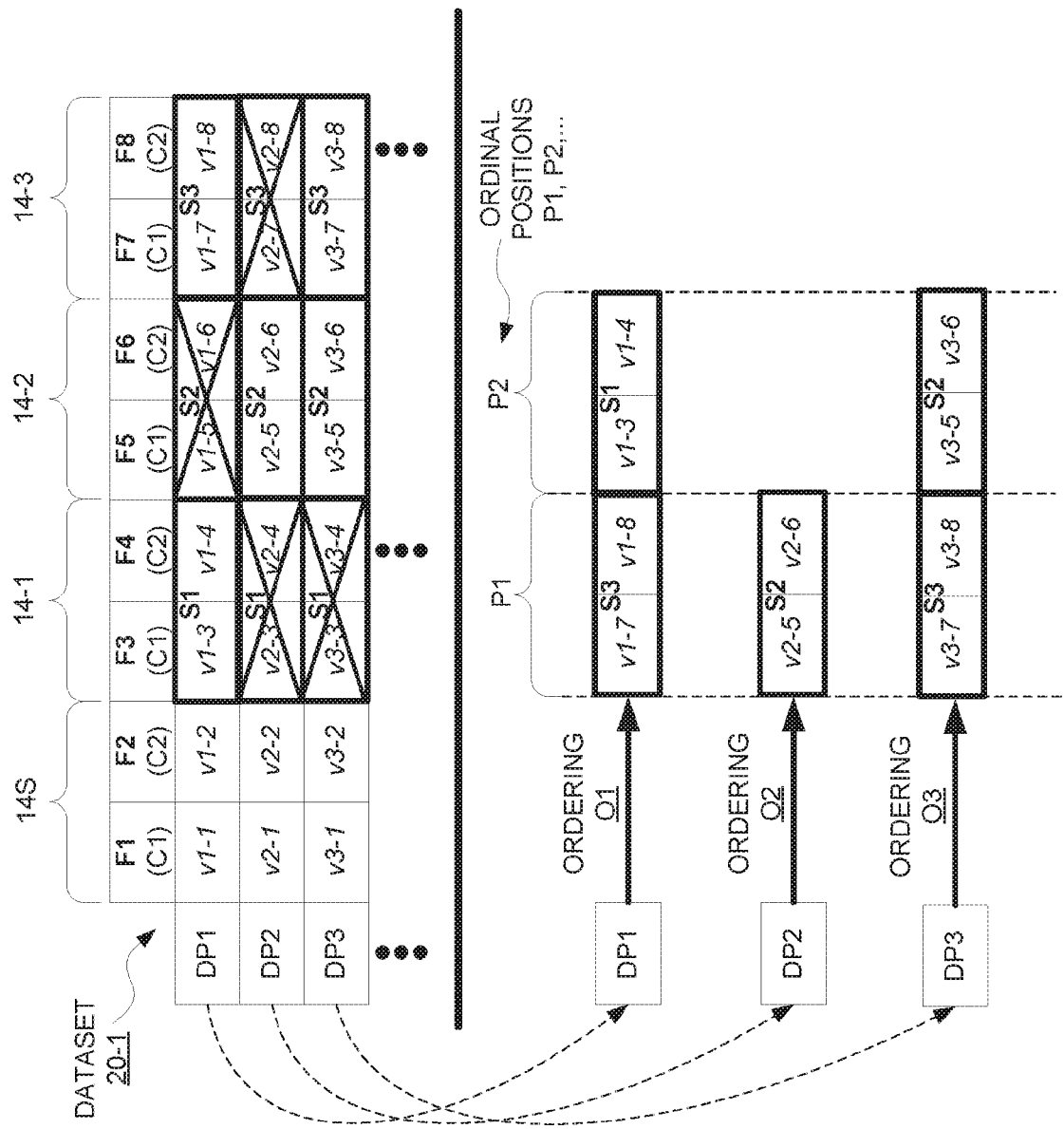
FIGS. 4A and 4B illustrate feature engineering for forming a second dataset from a first dataset according to some embodiments.
Figure 4B:
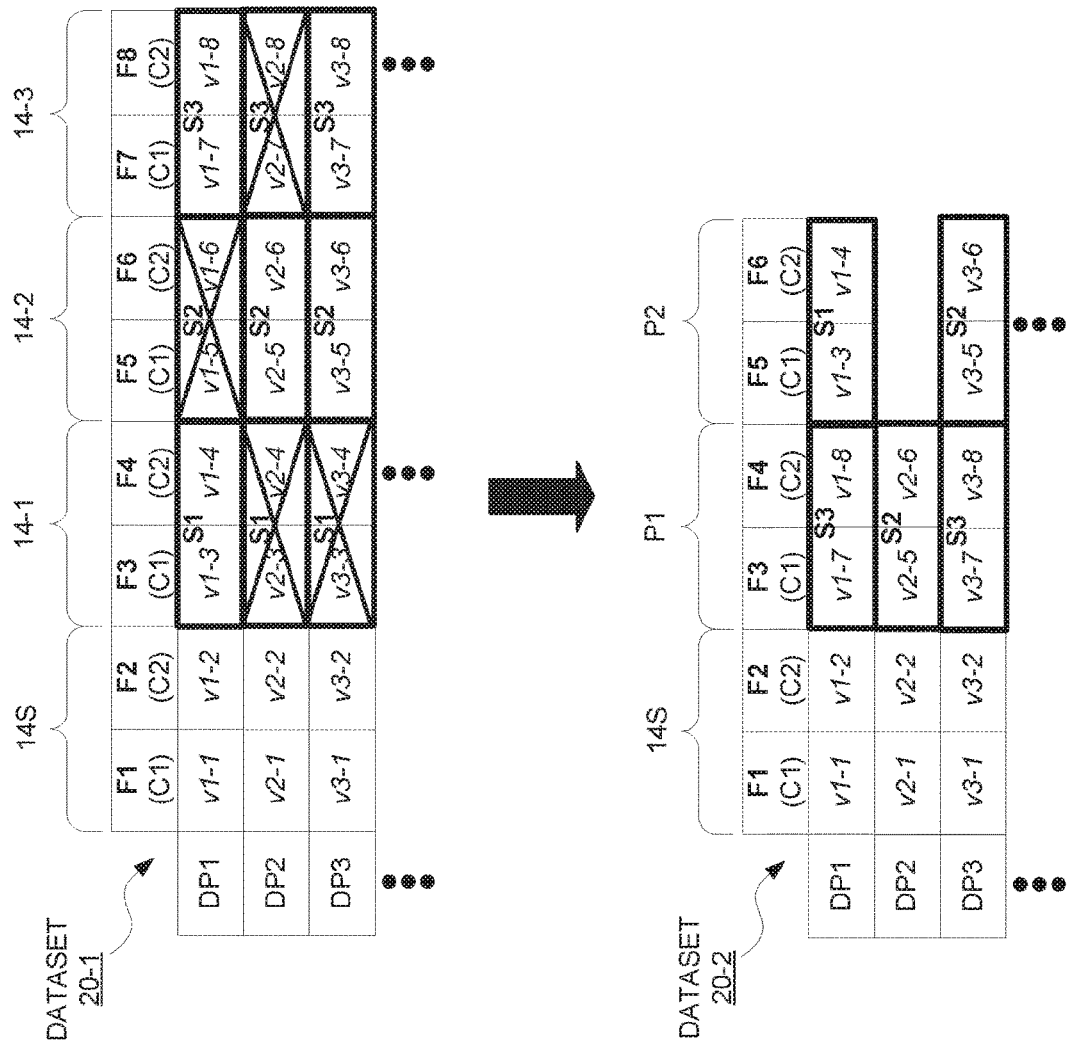

FIGS. 4A and 4B illustrate feature engineering for forming the second dataset 20-2 from the first dataset 20-1 according to some embodiments. As shown in FIG. 4A, feature engineering equipment 22 determines, for each datapoint DP1, DP2, and DP3 of the first dataset 20-1, a datapoint-specific ordering of one or more cell-specific sets of the datapoint. In the example shown, for instance, feature engineering equipment 22 determines an ordering O1 specific to datapoint DP1, an ordering O2 specific to datapoint DP2, and an ordering O3 specific to datapoint DP3, e.g., using the same ordering scheme or criteria across the orderings O1, O2, and O3.

The ordering O1 determined for datapoint D1 is an ordering of the cell-specific sets S1 and S3 of DP1, since those are the cell-specific sets for which the datapoint DP1 has values. Note here that, even though datapoint DP1 has values for cell-specific set S0, the feature engineering equipment 22 may except that cell-specific set S0 from the ordering O1, since that cell-specific set S0 is specific to serving cell 14S, e.g., so as to constitute a reference cell across the datapoints. In any event, as shown, the ordering O1 for datapoint D1 orders cell-specific set S3 first, i.e., in the first ordinal position P1. And the ordering O1 for datapoint D1 orders cell-specific set S1 second, i.e., in the second ordinal position P2.

Similarly, the ordering O2 determined for datapoint D2 is an ordering of only cell-specific set S2 of DP2, since that is the only cell-specific set for which the datapoint DP2 has values (other than cell-specific set S0 which is excepted out of the ordering O2 due to it being specific to the serving cell 14S). With cell-specific set S2 being the only set in the ordering O2, the ordering O2 orders cell-specific set S2 in the first ordinal position P1.

Finally, the ordering O3 determined for datapoint D3 is an ordering of cell-specific sets S2 and S3 of DP3, since those are the cell-specific sets for which the datapoint DP3 has value (again, other than cell-specific S0 which is excepted out of the ordering O3 too). As shown, the ordering O3 for datapoint D3 orders cell-specific set S3 first, i.e., in the first ordinal position P1. And the ordering O3 for datapoint D3 orders cell-specific set S2 second, i.e., in the second ordinal position P2.

From these datapoint-specific orderings O1, O2, and O3, the feature engineering equipment 22 forms the second dataset 20-2 as shown in FIG. 4B. Rather than the second dataset 20-2 including cell-specific features that are specific to cells 14-1, 14-2, and 14-3, the second dataset 20-2 includes ordinal-position-specific features that are specific to respective ordinal positions P1, P2 in the datapoint-specific orderings O1, O2, and O3. As shown, for example, the second dataset 20-2 includes ordinal-position-specific features F3 and F4 that are specific to ordinal position P1. In this regard, feature F3 represents the first characteristic C1 associated with ordinal position P1 and feature F4 represents the second characteristic C2 associated with ordinal position P1. And the second dataset 20-2 includes ordinal-position-specific features F5 and F6 that are specific to ordinal position P2. Specifically, feature F5 represents the first characteristic C1 associated with ordinal position P2 and feature F6 represents the second characteristic C2 associated with ordinal position P2. The feature engineering equipment 22 thereby transforms the cell-specific features for cells 14-1, 14-2, and 14-3 into ordinal-position-specific features for ordinal positions P1, P2. When the datasets each lack values for at least one cell-specific feature, the number of ordinal-position-specific features of the second dataset 20-2 is less than the number of cell-specific features of the first dataset 20-1, i.e., so as to advantageously achieve reduced dimensionality of the feature space.

The feature engineering also makes it to where the cell-specific sets for cells 14-1, 14-2, and 14-3 are ordinal-position-specific. As shown, for example, datapoint DP1 of the second dataset 20-2 includes set S3 that is specific to ordinal position P1 and set S1 that is specific to ordinal position P2. Each of the ordinal-position-specific sets S3, S1 includes values for features that are specific to the same ordinal position. Set S3 in this regard includes values v1-7 and v1-8 for respective features F3 and F4 that are specific to ordinal position P1, while set S1 includes values v1-3 and v1-4 for respective features F5 and F6 that are specific to ordinal position P2.

Datapoint DP2 of the second dataset 20-2 includes set S2 that is specific to ordinal position P1. Set S2 in this regard includes values v2-5 and v2-6 for features F3 and F4 that are specific to ordinal position P1. Datapoint DP2 does not include any set specific to ordinal position P2.

Finally, datapoint DP3 of the second dataset 20-2 includes set S3 that is specific to ordinal position P1 and set S2 that is specific to ordinal position P2. Each of the ordinal-position-specific sets S2, S3 includes values for features that are specific to the same ordinal position. Set S3 in this regard includes values v3-7 and v3-8 for respective features F3 and F4 that are specific to ordinal position P1, while set S2 includes values v3-5 and v3-6 for respective features F5 and F6 that are specific to ordinal position P2.

As seen from this example, each ordinal-position-specific feature in the second dataset 20-2 may in some cases be formed from a combination of multiple cell-specific features of the first dataset 20-1. For example, the second dataset 20-2 includes values v1-7, v2-5, and v3-7 for the ordinal-position-specific feature F3, such that the feature F3 is formed from a combination of the cell-specific features F5 and F7 in the first dataset 20-1. As another example, the second dataset 20-2 includes values v1-3 and v3-5 for the ordinal-position-specific feature F5, such that the feature F5 is formed from a combination of the cell-specific features F3 and F5 in the first dataset 20-1. It is this combination of cell-specific features into ordinal-position-specific features that effectively condenses the first dataset 20-1 into the second dataset 20-2.

Note, though, that the feature engineering equipment 22 may nonetheless preserve at least some features of the first dataset 20-1, so that the preserved feature(s) are still included in the second dataset 20-2. As seen in these examples, for instance, the feature engineering equipment 22 preserves the features F1 and F2 that are specific to the serving cell 14S. Accordingly, even though the features F1 and F2 are cell-specific features, the feature engineering equipment 22 excepts those features F1 and F2 from the orderings O1, O2, and O3, in favor of including those features as-is in the second dataset 20-2. The feature engineering and associated feature dimensionality reduction may thereby impact only a portion of the first dataset's features, rather than necessarily impacting all of the first dataset's features.

Consider now additional details about how the feature engineering equipment 22 may determine the datapoint-specific orderings O1, O2, and O3 of the cell-specific sets in the first dataset 20-1. The feature engineering equipment 22 may determine these orderings O1, O2, and O3 using any scheme or criteria, provided that the same scheme or criteria is used commonly for each of the orderings O1, O2, and O3. Indeed, by using the same ordering scheme or criteria for each of the orderings, the ordinal positions P1, P2, etc. have the same meanings across the orderings O1, O2, and O3. In each of the orderings O1, O2, and O3, then, whatever cell-specific set has ordinal position P1, it means the cell-specific set is first when ordered according to the common scheme or criteria. Whatever cell-specific set has ordinal position P2, it means the cell-specific set is second when ordered according to the common scheme or criteria. And so on.

As one example of the ordering scheme or criteria, in some embodiments, the ordering for each respective datapoint DP1, DP2, and DP3 orders cell-specific set(s) of the datapoint based on the numerical ordering of the values included in the cell-specific set(s) for a certain one of the cell-specific features, e.g., the values included in the cell-specific set(s) for whatever cell-specific feature represents a certain characteristic C1 or C2.

Figure 5A:
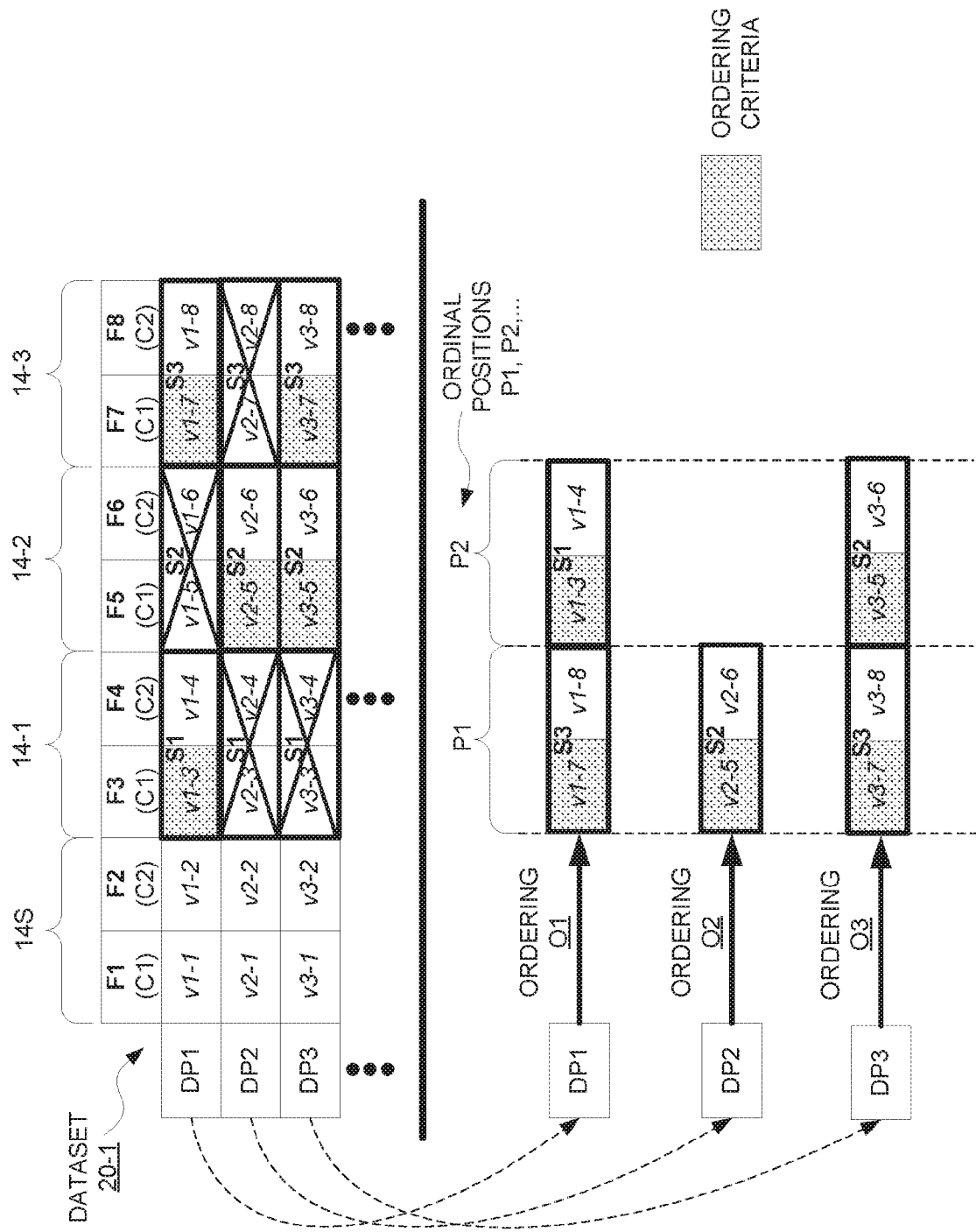
FIG. 5A shows an example where cell-specific sets in a first dataset are ordered based on the numerical ordering of the values included in cell-specific sets for whatever cell-specific feature represents a first characteristic.

FIG. 5A shows an example where cell-specific sets in the first dataset 20-1 are ordered based on the numerical ordering of the values included in the cell-specific sets for whatever cell-specific feature represents the first characteristic C1. In this case, the ordering O1 for datapoint DP1 orders the cell-specific sets S1 and S3 of datapoint DP1 based on the numerical ordering of the values included in those cell-specific sets S1 and S3 for whatever cell-specific feature represents the first characteristic C1. As shown in FIG. 5A, in cell-specific set S1 of datapoint DP1, this is the value v1-3 for cell-specific feature F3, since feature F3 represents the first characteristic C1 associated with cell 14-1. And in cell-specific set S3 of datapoint DP1, this is the value v1-7 for cell-specific feature F7, since feature F7 represents the first characteristic C1 associated with cell 14-3. The ordering O1 may accordingly order the cell-specific sets S1 and S3 of datapoint DP1 based on the numerical ordering of values v1-3 and v1-7, as highlighted. If the numerical ordering is to be in descending order, this means that the cell-specific sets S1 and S3 of datapoint DP1 are to be ordered so that the values v1-3 and v1-7 descend in order. In this case, then, the ordering O1 would order set S3 in position P1 and set S1 in position P2, as shown, based on value v1-7 for feature F7 being larger than value v1-3 for feature F3. Similarly, in this example, the ordering O3 for datapoint DP3 would order set S3 in position P1 and set S2 in position P2, as shown, based on the value v3-7 for feature F7 being larger than the value v3-5 for feature F5.

In the above example, cell-specific sets are effectively ordered in descending order of the values that those sets respectively include for a feature representing the first characteristic C1. In an embodiment where this first characteristic is RSRP, as reported by a wireless communication device, this means the cell-specific sets are ordered in descending order of the RSRP values respectively included in those sets. So, set S3 having the first ordinal position P1 in the ordering O1 for datapoint DP1 means that the RSRP value included in set S3 of datapoint DP1 is the largest RSRP value among the sets S1, S2, and S3 of datapoint DP1, i.e., the largest RSRP value reported among the neighbor cells 14-1, 14-2, and 14-3. Set S1 having the second ordinal position P2 in the ordering O1 for datapoint DP1 means that the RSRP value included in set S1 of datapoint DP1 is the second largest RSRP value among the sets S1, S2, and S3 of datapoint DP1, i.e., the second largest RSRP value reported among the neighbor cells 14-1, 14-2, and 14-3. And so on. Common to all of the orderings O1, O2, and O3 in this case, then, the ordinal positions P1, P2, etc. reflect the relative RSRP values among whatever cells have RSRP values represented in each datapoint DP1, DP2, and DP3.

With decreasing RSRP values generally suggesting increasing distance, these embodiments effectively order the cell-specific sets in order of increasing distance from the wireless communication device that measured and reported the RSRP values. Operating on that generalization, set S3 having the first ordinal position P1 in the ordering O1 for datapoint DP1 would generally mean that cell 14-3 is the closest to the wireless communication device that reported the values of the datapoint DP1. Set S1 having the second ordinal position P2 in the ordering O1 for datapoint DP1 would generally mean that cell 14-1 is the second closest to the wireless communication device that reported the values of the datapoint DP1. And so on. Common to all of the orderings O1, O2, and O3 in this case, then, the ordinal positions P1, P2, etc. reflect the relative spatial distance of whatever cells have values represented in each datapoint DP1, DP2, and DP3.

Figure 5B:
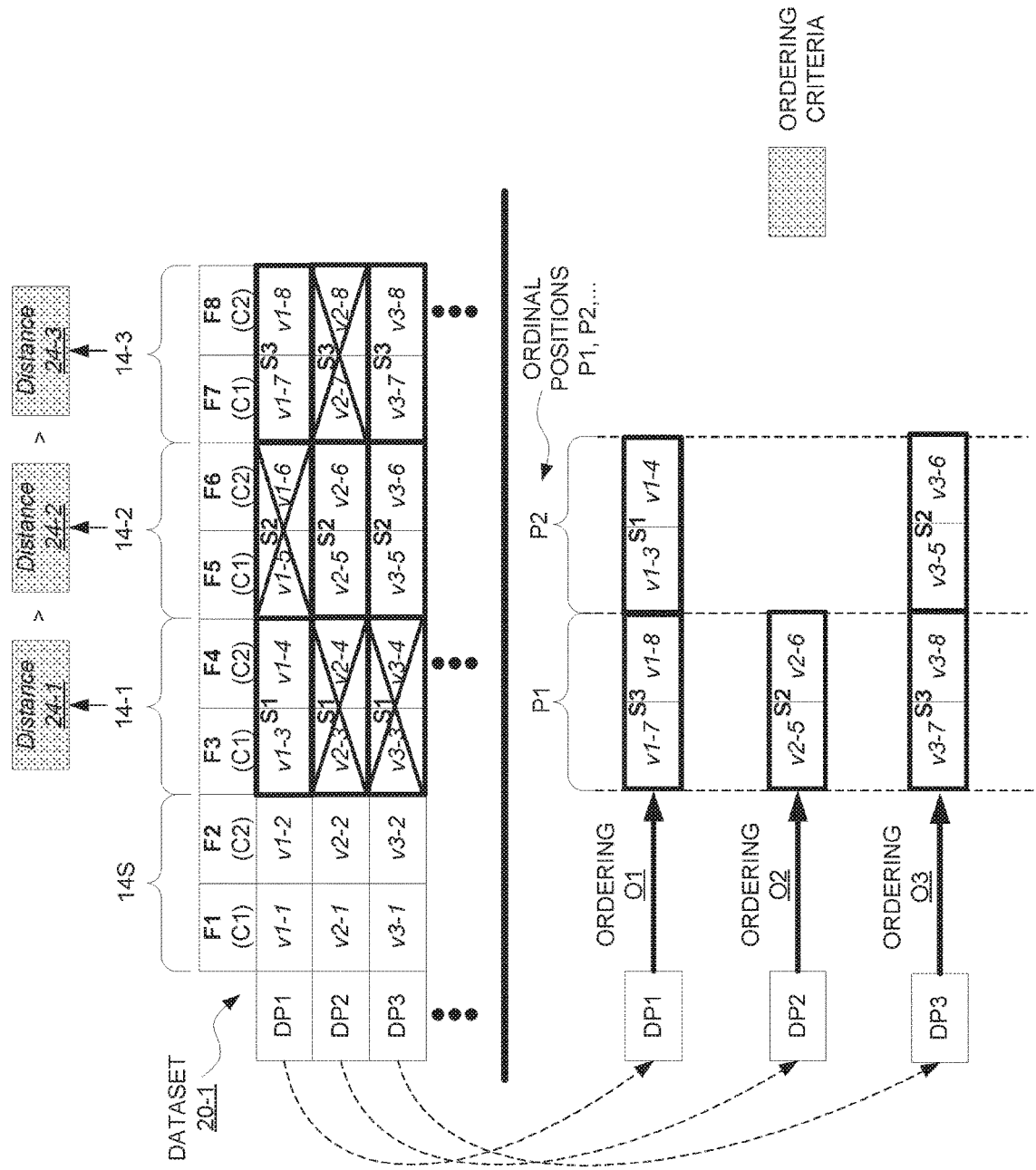
FIG. 5B shows a feature engineering equipment determining, for each of multiple cells, a geographical distance between the cell and a reference cell.

In other embodiments, though, rather than ordering the cell-specific sets based on a characteristic that is impacted by the spatial relationship between the cells, the feature engineering equipment 22 orders the cell-specific sets based on that spatial relationship itself. As shown in FIG. 5B, for example, the feature engineering equipment 22 determines, for each of the cells 14-1, 14-2, and 14-3, a geographical distance between that cell and a reference cell (e.g., the serving cell 14S). In this example, the geographical distance 24-3 for cell 14-3 is the smallest, the geographical distance 24-2 for cell 14-2 is the next smallest, and the geographical distance 24-1 for cell 14-1 is the largest. The feature engineering equipment 22 orders the cell-specific set(s) for each datapoint DP1, DP2, and DP3 based on these geographical distances 24-1, 24-2, and 24-3.

In particular, in order to determine the ordering O1 for datapoint DP1, the feature engineering equipment 22 determines, for each of the cell-specific sets S1 and S3 to be ordered, the geographical distance between the reference cell and the cell to which the cell-specific set is specific. In this case, the feature engineering equipment 22 determines geographical distance 24-1 for cell-specific set S1 of datapoint DP1 and determines geographical distance 24-3 for cell-specific set S3 of datapoint DP1. The feature engineering equipment 22 then determines the ordering O1 by ordering the sets S1 and S3 of datapoint DP1 in order of those geographical distances 24-1, 24-3. For example, when the sets S1 and S3 are to be ordered in ascending geographical distance, the ordering O1 as shown orders set S3 in the first ordinal position P1 and the set S1 in the second ordinal position P2, because the geographical distance 24-3 for set S3 is smaller than the geographical distance 24-1 for set S1. Similarly, the feature engineering equipment 22 determines geographical distance 24-2 for cell-specific set S2 of datapoint DP3 and determines geographical distance 24-3 for cell-specific set S3 of datapoint DP3. The feature engineering equipment 22 then determines the ordering O3 by ordering the sets S2 and S3 of datapoint DP3 in order of those geographical distances 24-2, 24-3. For example, when the sets S2 and S3 are likewise to be ordered in ascending geographical distance, the ordering O3 as shown orders set S3 in the first ordinal position P1 and the set S2 in the second ordinal position P2, because the geographical distance 24-3 for set S3 is smaller than the geographical distance 24-2 for set S2.

Note that, in some embodiments, such as where the measurement reports R1, R2, and R3 identify the cells associated with the reported measurements by a non-global cell identity (e.g., a Physical Cell Identity, PCI), the feature engineering equipment 22 may need to map non-global cell identities to their corresponding global cell identity (e.g., Cell Global Identifiers, CGIs) in order to determine the geographical distances between the cells. Some embodiments accordingly exploit persistent connection management (CM) data in order to deduce the mapping from non-global cell identities to global cell identities. From a sector location file, the feature engineering equipment 22 may then read the latitude and longitude of each (static) cell, and correspondingly determine the geographical distances between the cells for feature engineering as described above.

Regardless of the particular way that the cell-specific sets are ordered, machine learning may then be based directly or indirectly on the second dataset 20-2. In one embodiment, for example, machine learning directly utilizes the second dataset 20-2. By contrast, in another embodiment where machine learning is only indirectly based on the second dataset 20-2, a derivative of the second dataset 20-2 is formed and then machine learning proceeds based directly on this derivative.

Figures 6A, 6B:
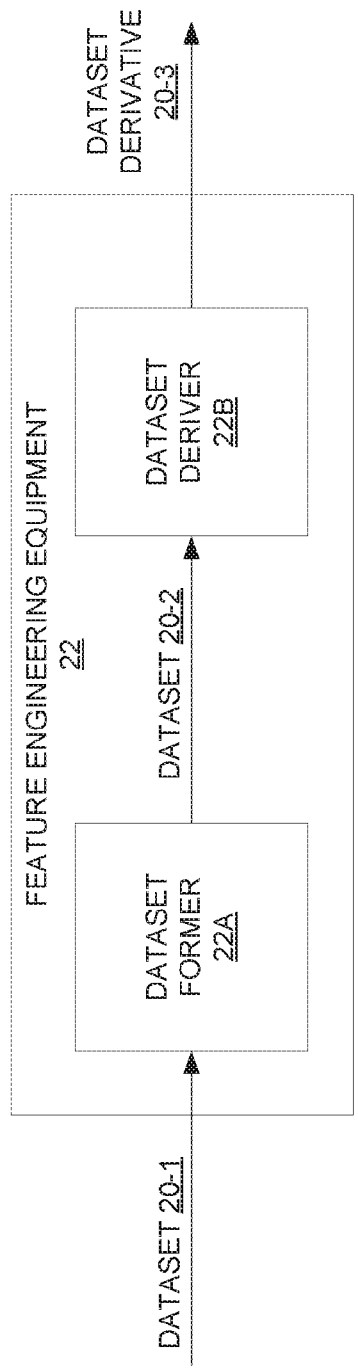
FIG. 6A shows an example of feature engineering equipment in embodiments where machine learning is based indirectly on a second dataset.
FIG. 6B shows that, in addition to the features of the second dataset, a derivative includes derived features.

FIG. 6A shows one example of feature engineering equipment 22 in embodiments where machine learning is based indirectly on the second dataset 20-2. As shown, feature engineering equipment 22 includes dataset former 22A that forms the second dataset 20-2 from the first dataset 20-1 as described above. Feature engineering equipment 22 also includes dataset deriver 22B that derives a dataset derivative 20-3 from the second dataset 20-2. Machine learning may then be performed based directly on this derivative 20-3.

In some embodiments, the dataset deriver 22B derives the derivative 20-3 by adding one or more features to the second dataset 20-2. FIG. 6B for example shows that, in addition to the features F1-F6 of the second dataset 20-2, the derivative 20-3 includes derived features F-D1 and F-D2. Moreover, the datapoints D1-D3 of the derivative 20-3 each include respective values for at least some of the derived features F-D1 and F-D2. In some embodiments, one or more of the derived features may be ordinal-position-specific. As shown, for example, derived feature F-D1 is specific to ordinal position P1 and derived feature F-D2 is specific to ordinal position P2.

For example, in some embodiments, the feature engineering equipment 22 forms the derivative 20-3 by creating one or more combined features in the derivative 20-3. In one such embodiment, each combined feature is a combination of multiple features of the second dataset 20-2.

In one embodiment, at least one combined feature is a combination of one ordinal-position-specific feature of the second dataset 20-2 and one non-ordinal-position-specific feature of the second dataset 20-2, e.g., where the non-ordinal-position-specific feature of the second dataset is specific to a reference cell in the wireless communication network 10. FIG. 6C shows one example of this. As shown, derived feature F-D1 is a combined feature formed from a combination of features F2 and F4, and derived feature F-D2 is a combined feature formed from a combination of features F2 and F6. Features F4 and F6 are ordinal-position-specific features that are respectively specific to ordinal positions P1 and P2, whereas feature F2 is a non-ordinal-position-specific feature that is specific to a reference cell (in the form of serving cell 14S). Accordingly, derived feature F-D1 is a combination of ordinal-specific feature F4 and non-ordinal-specific feature F2, and derived feature F-D2 is a combination of ordinal-specific feature F6 and non-ordinal-specific feature F2. In one example, at least one combined feature represents the difference in the values for the two features combined. In this case, feature F-D1 represents the difference in the value v1-8 for ordinal-specific feature F4 and the value v1-2 for non-ordinal-specific feature F2, and feature F-D2 represents the difference in the value v1-4 for ordinal-specific feature F6 and the value v1-2 for non-ordinal-specific feature F2. Where the second characteristic C2 represents RSRQ, for example, derived feature F-D1 may represent the difference in the RSRQ for the cell in ordinal position P1 and the RSRQ for the serving cell 14S, and derived feature F-D2 may represent the difference in the RSRQ for the cell in ordinal position P2 and the RSRQ for the serving cell 14S. Although not shown, derived features may be additionally or alternatively created for features associated with the first characteristic C1, e.g., such that one derived feature represents the difference in the RSRP for the cell in ordinal position P1 and the RSRP for the serving cell 14S, and another derived feature represents the difference in the RSRP for the cell in ordinal position P2 and the RSRP for the serving cell 14S.

In another embodiment, at least one combined feature is a combination of two ordinal-position-specific features of the second dataset 20-2 that are specific to two consecutive ordinal positions in the datapoint-specific orderings O1, O2, and O3. FIG. 6D shows one example of this. As shown, derived feature F-D2 is a combined feature formed from a combination of features F4 and F6, which are ordinal-position-specific features that are respectively specific to consecutive ordinal positions P1 and P2. In an example where the combined feature F-D2 represents the difference in the values for the two features combined, feature F-D2 represents the difference in the value v1-4 for ordinal-specific feature F6 and the value v1-8 for ordinal-specific feature F4. Where characteristic C2 represents RSRQ, for example, derived feature F-D2 may thereby represent the difference in the RSRQ for the cell in ordinal position P2 and the RSRQ for the cell in ordinal position P1.

Figure 6E:
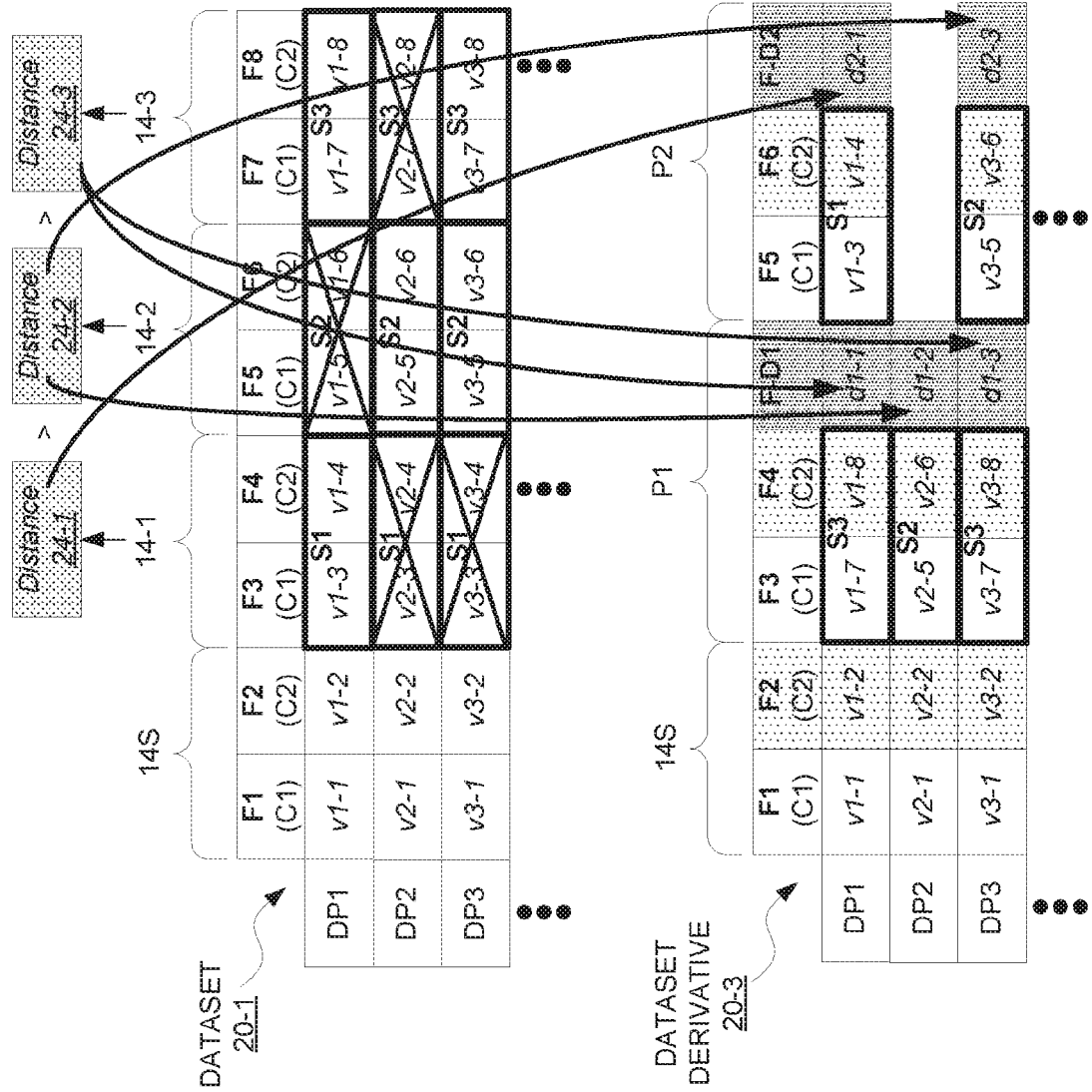
FIG. 6E illustrates an example where a geographic position feature characterizes a geographic position of a cell in terms of a distance between the cell and a serving cell.

In other embodiments, the feature engineering equipment 22 forms the derivative 20-3 of the second dataset 20-2 by creating in the derivative 20-3, for each ordinal position P1, P2 in the datapoint-specific orderings O1, O2, O3, a geographic position feature that characterizes a geographic position of a cell associated with that ordinal position. This geographic position feature may characterize the geographic position of the cell in any number of ways. For example, the geographic position feature may characterize the geographic position of the cell in terms of a distance between the cell and the serving cell 14S. Or, the geographic position feature may characterize the geographic position of the cell in terms of one or more coordinates, e.g., an X and/or Y coordinate of the cell in a coordinate system where the origin is placed on the location of the serving cell 14S. FIG. 6E illustrates one example where the geographic position feature characterizes the geographic position of a cell in terms of a distance between the cell and the serving cell 14S, e.g., using FIG. 5B as a starting point for the example.

As shown in FIG. 6E, the derived features F-D1 and F-D2 are geographic position features formed for respective ordinal positions P1 and P2. Geographic position feature F-D1 characterizes the geographic position of a cell associated with ordinal position P1, and geographic position feature F-D2 characterizes the geographic position of a cell associated with ordinal position P2. Which cell is associated with which ordinal position is datapoint-specific. For datapoint DP1, the cell associated with ordinal position P1 is cell 14-3 and the cell associated with ordinal position P2 is cell 14-1. Accordingly, datapoint DP1 includes the distance 24-3 associated with cell 14-3 as the value d1-1 of the geographic position feature F-D1 and includes the distance 24-1 associated with cell 14-1 as the value d2-1 of the geographic position feature F-D2. For datapoint DP2, the cell associated with ordinal position P1 is cell 14-2. Accordingly, datapoint DP2 includes the distance 24-2 associated with cell 14-2 as the value d1-2 of the geographic position feature F-D1. Finally, for datapoint DP3, the cell associated with ordinal position P1 is cell 14-3 and the cell associated with ordinal position P2 is cell 14-2. Accordingly, datapoint DP3 includes the distance 24-3 associated with cell 14-3 as the value d1-3 of the geographic position feature F-D1 and includes the distance 24-2 associated with cell 14-2 as the value d2-3 of the geographic position feature F-D2.

Of course, although the above embodiments exemplified the derivative 20-3 as including one derived feature per ordinal position, the derivative 20-3 may have any combination of the above derived features per ordinal position. For example, the derivative 20-3 may include, for each ordinal position, two or more of: (i) one derived feature that represents the difference in the RSRP for the cell in the ordinal position and the RSRP for the serving cell 14S; (ii) one derived feature that represents the difference in the RSRQ for the cell in the ordinal position and the RSRQ for the serving cell 14S; (iii) one geographic position feature that characterizes the geographic position of the cell associated with the ordinal position in terms of an X coordinate of the cell; and (iv) one geographic position feature that characterizes the geographic position of the cell associated with the ordinal position in terms of a Y coordinate of the cell.

Figure 2:
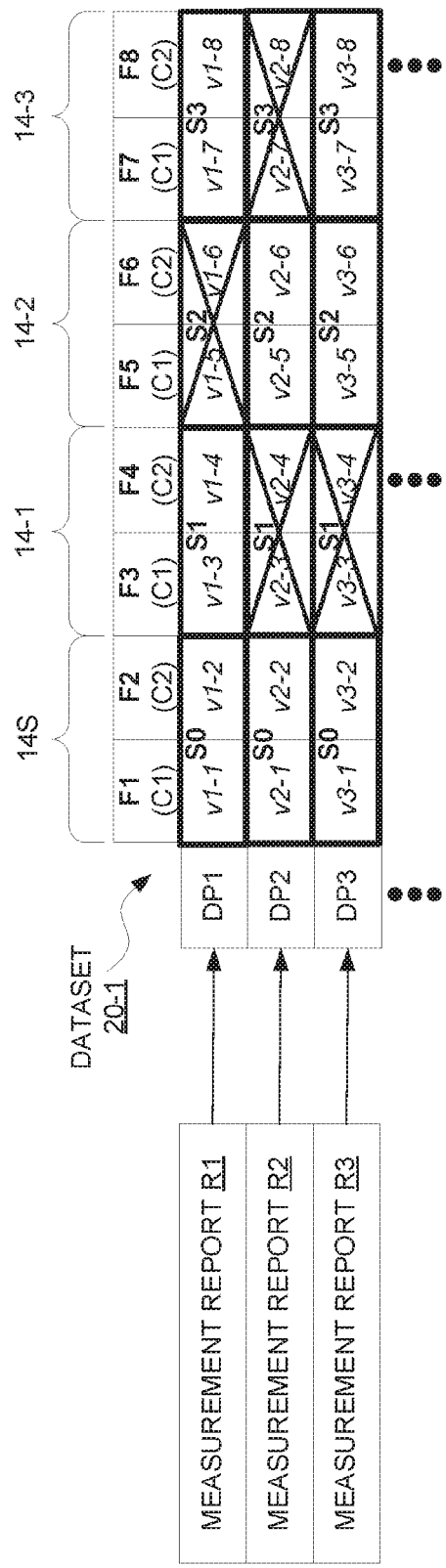
FIG. 2 shows a dataset that is generated by performing feature extraction on measurement reports according to some embodiments.

Note also that, although embodiments above have been exemplified in a context where the first dataset 20-1 lacks values for at least some of the features, embodiments herein may apply in other contexts as well. For example, in some embodiments, at least one datapoint of the first dataset 20-1 comprises at least one cell-specific set that includes one or more default values for one or more respective cell-specific features that are specific to the same cell. In FIG. 2, for instance, rather than the first dataset 20-1 lacking values v1-5, v1-6, v2-3, v2-4, v2-7, v2-8, v3-3, and v3-4, the first dataset 20-1 may include default values for those values. In this case, feature engineering equipment 22 may treat those default values as described above for missing values. That is, the feature engineering equipment 22 may effectively condense the first dataset 20-1 into the second dataset 20-2 by removing the default values.

These and other embodiments may effectively reduce feature dimensionality so as to reduce the processing and memory resource requirements for machine learning. In fact, in some embodiments, the number of ordinal-position-specific features of the second dataset 20-2 is less than the number of cell-specific features of the first dataset 20-1. In order to account for any derivative 20-3 that may add ordinal-position-specific features, though, consider an example where each cell-specific set includes K values for K respective cell-specific features that are specific to the same cell. In the case where the first dataset 20-1 includes D datapoints, where let $J_d$ be the number of cell-specific sets comprised in datapoint d of the first dataset 20-1. And let $J_{d,max}$ be the maximum $J_d$ across the D datapoints of the first dataset 20-1. In some embodiments, then, the number of ordinal-position-specific features of the second dataset 20-2 is greater than or equal to $K*J_{d,max}$.

Figure 7:
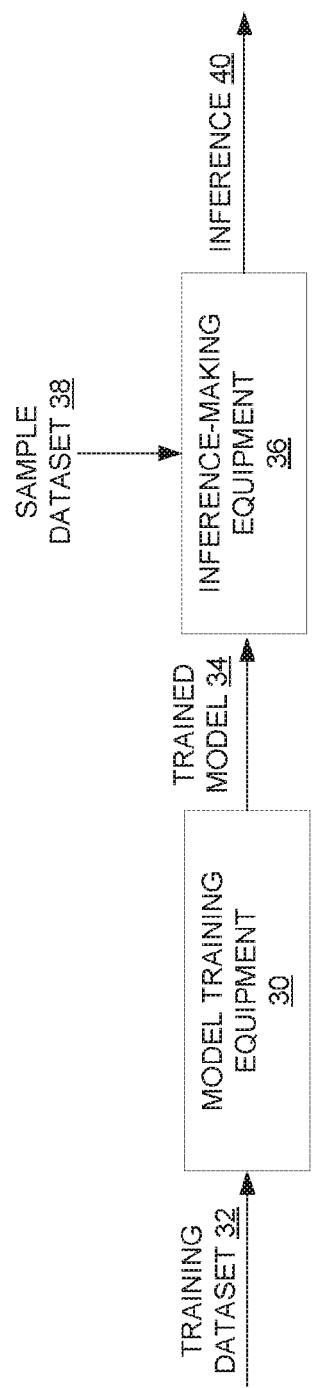
FIG. 7 shows some embodiments that use a second dataset or a derivative thereof for machine learning.

In any event, some embodiments herein exploit the second dataset 20-2, or the derivative 20-3 thereof, for machine learning in the context shown in FIG. 7. As shown, model training equipment 30 uses a training dataset 32 to train a machine learning model, resulting in a trained model 34, e.g., in the form of a regression model, classification model, or any other type of model trainable via machine learning. Inference-making equipment 36 analyses a sample dataset 38 based on the trained model 34, in order to make an inference 40. In some embodiments, feature engineering equipment 22 performs the feature engineering described above in order to form the training dataset 32 and/or the sample dataset 38. That is, feature engineering equipment 22 may form the training dataset 32 in the same way as described above for forming the second dataset 20-2, or the derivative 20-3 thereof, and/or may form the sample dataset 38 in the same way as described above for forming the second dataset 20-2, or the derivative 20-3 thereof. Accordingly, the second dataset 20-2, or the derivative 20-3 thereof, may represent the training dataset 32 and/or the sample dataset 38.

In some embodiments, the inference 40 is an inference about whether an anomaly exists in the wireless communication network 10. In one embodiment, the inference-making equipment 36 is capable of making an inference about the existence of any number of possible anomalies that are in or indicated by measurement report(s). Such possible anomalies may for example include an anomaly attributable to obstructions (e.g., buildings), an anomaly attributable to a malicious wireless communication device, an anomaly attributable to a false cell or false base station, or any combination thereof.

More particularly, the measurement report(s) shared by wireless communication devices may contain anomalous patterns. These anomalous patterns may be introduced unintentionally by actions that alter the reported values in measurement reports. Such actions may be caused, for instance, by building structures built/removed, temporary civil work, extreme weather conditions, changing topology in the vicinity of a cell, etc.

The anomalous patterns may alternatively or additionally be introduced intentionally. For example, a malicious wireless communication device may send crafted measurements to affect network optimization. For example, an adversary may take control of several end devices and use them as bots to report erroneous RSRP/RSRQ values for legitimate cells. One of the purposes may be to poison measurement report data and thus make it harder for the network to keep optimum performance. The problem may be more pronounced with widespread increase in Internet-of-Things (IoT) or industrial IoT devices using radio access network services. This is the case of malicious UEs trying to misrepresent legitimate cells and causing signaling anomalies in the process.

As another example, a false cell may intentionally introduce anomalies into the measurement reports. A false cell is a cell that is not provided by radio equipment belonging to the wireless communication network 10 (e.g., according to the network topology and/or under the network operator's control) but that nonetheless attempts to transmit to and/or receive from wireless devices as if the cell was a genuine cell. A false cell may for example masquerade as a genuine cell and surreptitiously lure wireless devices to transmit to and/or receive from the false cell, in order to passively and/or actively attack those wireless devices. A false cell may masquerade as a genuine cell by falsely advertising the wireless communication network's identity as the identity of the network to which the false cell belongs. To more convincingly masquerade as a genuine cell, a false cell might also use the same cell identity as a genuine cell. To lure wireless devices to it, a false cell may operate with higher-than-normal power which is then reported by benign wireless communication devices. From the network perspective, this creates a signal power anomaly.

A false cell may be operated by a false base station. A false base station is a generic name for a digital device which intentionally (and most often with a malicious intent) tries to impersonate a genuine base station. It can be used for unauthorized surveillance by catching International Mobile Subscription Identifiers (IMSIs), communication sabotage by performing denial of service (DoS) on devices or the network, and unsolicited advertising by sending unwarranted marketing Short Messaging Service (SMS) messages to mobile devices. A false base station may also be known by other names such as a rogue base station, an IMSI catcher, Stingray, or a cell site simulator.

Figure 8A:
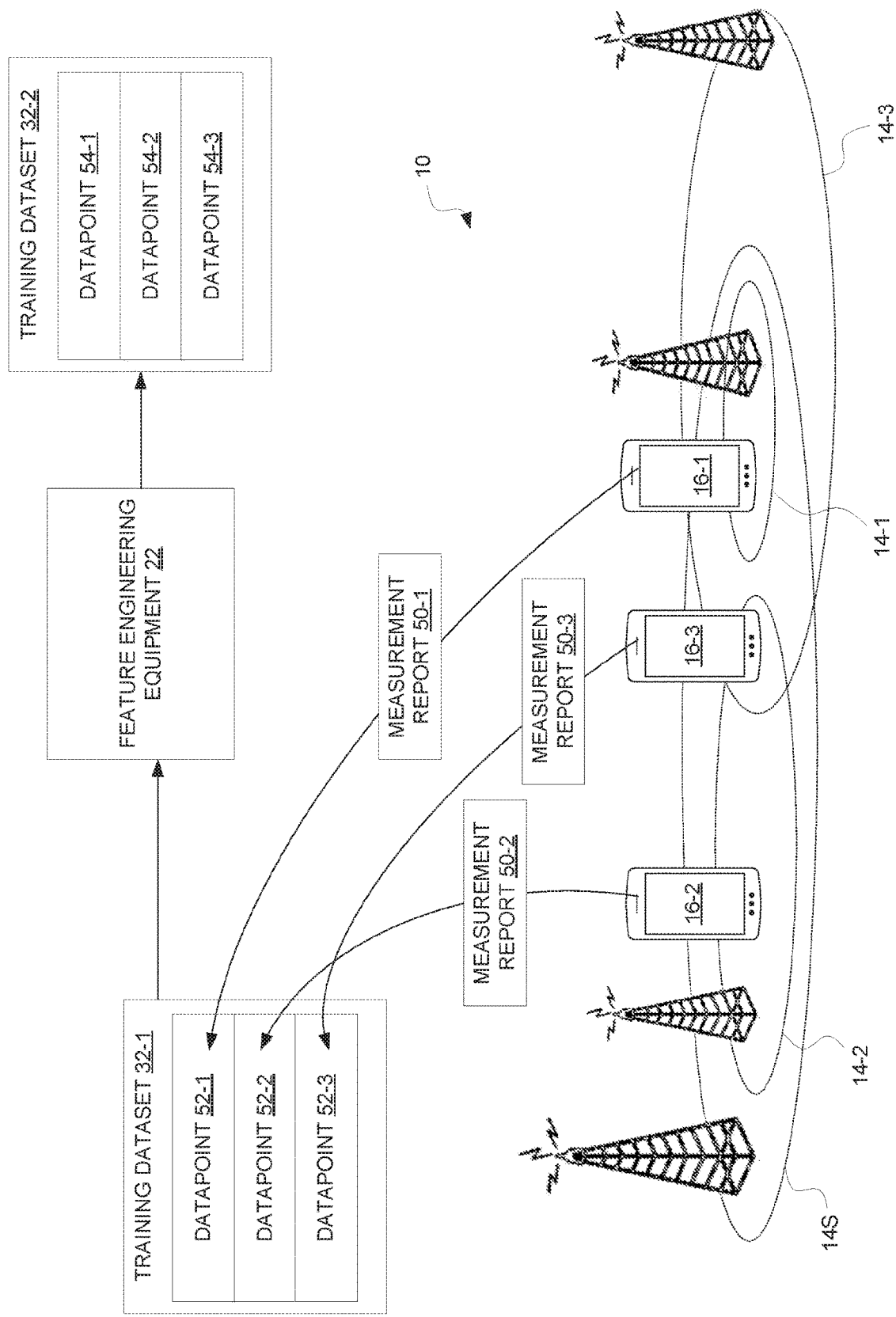
FIG. 8A and FIG. 8B illustrate details of feature engineering according to some embodiments usable for making an inference about the existence of a false cell.
Figure 8B:
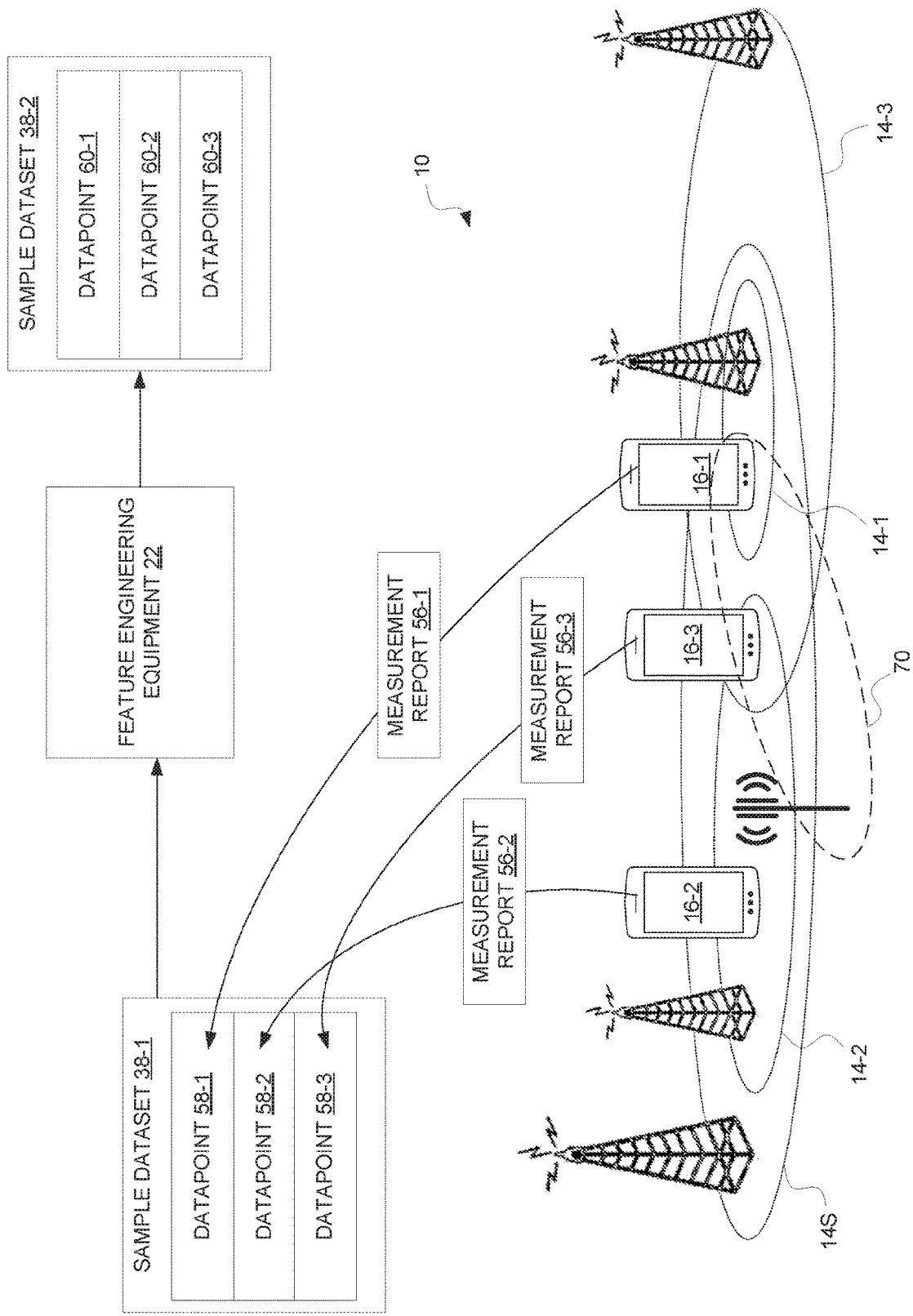

No matter the particular cause of anomalies in the measurement reports, some embodiments herein implement feature engineering as described above in order to make an inference about the existence of such anomalies, e.g., for reporting suspicious activity (in intentional cases) or optimizing network topology and radio links (in unintentional cases). FIGS. 8A and 8B illustrate additional details of such feature engineering according to some embodiments usable for making an inference about the existence of a false cell.

As shown in FIG. 8A, measurement reports 50-1, 50-2, and 50-3 are reported by wireless communication devices 16-1, 16-2, and 16-3 in the assumed absence of a false cell. These measurement reports thereby represent a "baseline" for what "normal" measurement reports look like, i.e., without the influence of a false cell. The measurement reports may for instance be acquired during an initial training phase, with tight control over physical access to the network's coverage area, or with other security mechanisms to safeguard against the introduction of false cells. The training phase in this regard may even be performed "offline". In this way the measurement reports would be contamination-free, e.g., free of contamination from false cells. In other cases, the network may assume that the measurement reports are contamination-free or have few contaminations when there is no degradation of key performance indicators or no complaints from customers. In yet other cases, the network may filter the measurement reports to only specific operator-controlled wireless devices at specific times where the chance of a false cell being present is minimum or nil. Regardless, embodiments herein recognize that sometimes it may not be known for certain whether the measurement reports are contaminated or not. But embodiments herein may nonetheless assume or operate under the assumption that they are in fact free of contamination from a false cell. In any event, the measurement reports may nonetheless effectively represent, as a baseline, the sort of combinations of values that are expected to be detected when no false cell is present.

In this context, a training dataset 32-1 is obtained based on these measurement reports 50-1, 50-2, and 50-3, with datapoints 52-1, 52-2, and 52-3 of the training dataset 32-1 respectively corresponding to those measurement reports 50-1, 50-2, and 50-3. This training dataset 32-1 represents one example of a first dataset 20-1 described herein. Indeed, in some embodiments, measurement reports sent by different wireless communication devices can collectively contain reports of hundreds of cells, e.g., up to 504 cells in an LTE network and up to 1008 cells in an NR network. In these embodiments, then, the values across the measurement reports may be scattered for many cells, making the feature space or dimensionality of the training dataset 32-1 high despite the values in the training dataset 32-1 being sparse (as most values may be missing).

As shown in FIG. 8A, then, feature engineering equipment 22 obtains training dataset 32-1 and forms, from training dataset 32-1, training dataset 32-2. Training dataset 32-1 is therefore appropriately referred to as the first training dataset 32-1 whereas training dataset 32-2 is referred to as the second training dataset 32-2. The first training dataset 32-1 is an example of a first dataset 20-1 and the second training dataset 32-2 is an example of a second dataset 20-2 as described herein. Indeed, whereas the first training dataset 32-1 has cell-specific features, the second training dataset 32-2 as formed by feature engineering equipment 22 has ordinal-position-specific features as described herein. With this second training dataset 32-2 formed, the feature engineering equipment 22 provides the second training dataset 32-2, or a derivative thereof, to the model training equipment 30 shown in FIG. 7 for training the machine learning model. The trained model 34 that results may for example include one or more parameters (e.g., a measure of central tendency, model fitting parameter(s), a 2-D curve, etc.) that effectively characterize the second training dataset 32-2 or the derivative thereof. The trained model 34 may also include one or more parameters (e.g., one or more thresholds) that characterize the type and/or amount of deviation from the second training dataset 32-2 (or its derivative), as modelled, which would suggest a false cell is present. The model training equipment 30 may thereby form the trained model 34 to test for the presence of a false cell based on an extent to which the sample dataset 38 differs from the second training dataset 32-2 (or its derivative).

FIG. 8B shows that feature engineering equipment 22 may similarly be used for forming the sample dataset 38 in FIG. 7. In particular, FIG. 8B shows that measurement reports 56-1, 56-2, and 56-3 are reported by wireless communication devices 16-1, 16-2, and 16-3, but this time there may or may not be a false cell 70 within the coverage of at least some of those devices, e.g., masquerading as one of the genuine cells 14S, 14-1, 14-2, or 14-3 by advertising the same cell identity as that genuine cell. In this case, the false cell 70 influences at least some of the measurement reports 56-1, 56-2, and 56-3.

In this context, a sample dataset 38-1 is obtained based on these measurement reports 56-1, 56-2, and 56-3, with datapoints 58-1, 58-2, and 58-3 of the sample dataset 38-1 respectively corresponding to those measurement reports 58-1, 58-2, and 58-3. This sample dataset 38-1 represents another example of a first dataset 20-1 described herein. Indeed, in some embodiments, measurement reports sent by different wireless communication devices can collectively contain reports of hundreds of cells, e.g., up to 504 cells in an LTE network and up to 1008 cells in an NR network. In these embodiments, then, the values across the measurement reports may be scattered for many cells, making the feature space or dimensionality of the sample dataset 38-1 high despite the values in the sample dataset 38-1 being sparse (as most values may be missing).

As shown in FIG. 8B, then, feature engineering equipment 22 similarly obtains sample dataset 38-1 and forms, from sample dataset 38-1, sample dataset 38-2. Sample dataset 38-1 is therefore appropriately referred to as the first sample dataset 38-1 whereas sample dataset 38-2 is referred to as the second sample dataset 38-2. The first sample dataset 38-1 is an example of a first dataset 20-1 and the second sample dataset 38-2 is an example of a second dataset 20-2 as described herein. Indeed, whereas the first sample dataset 38-1 has cell-specific features, the second sample dataset 38-2 as formed by feature engineering equipment 22 has ordinal-position-specific features as described herein. With this second sample dataset 38-2 formed, the feature engineering equipment 22 provides the second sample dataset 38-2, or a derivative thereof, to the inference-making equipment 36 shown in FIG. 7 for making the inference 40 based on the trained model 34.

The inference-making equipment 36 may for example perform false cell presence testing to test for the presence of a false cell 70 based on an extent to which the second sample dataset 38-2 differs from the second training dataset 32-2 according to the trained model 34. Such false cell presence testing may for instance yield a test result for the second sample dataset 38-2 as a whole or a test result for each test datapoint 60-1, 60-2, and 60-3 of the second sample dataset 38-2. A test result for the second sample dataset 38-2 as a whole would indicate whether a false cell is present considering the datapoints of the second sample dataset 38-2 collectively, whereas a test result for each datapoint would indicate whether a false cell is present considering each datapoint individually. In this latter case, then, the test result for each test datapoint may be a tag that flags the datapoint as anomalous if a false cell is detected as present, e.g., in the form of a Boolean value with TRUE meaning anomalous and FALSE meaning normal. In some embodiments, the test result indicates a hard decision as to whether or not a false cell is present, whereas in other embodiments the test result indicates a soft decision, with a probabilistic anomaly score reflecting the probability of a false cell being present. In any case, by testing for the presence of a false cell 70 in this way, the inference-making equipment 36 is able to detect the presence of a false cell 70 even if the false cell 70 is using the same cell identity as a genuine cell.

In some embodiments, if an anomaly is inferred to exist, an alarm is sent back to the serving cell 14S with an alert that a data anomaly has been detected. In one embodiment, this alert may also include additional information as to the possible location and identifier of the neighboring cell responsible for the anomaly.

More specifically, anomaly detection may be performed according to any of the approaches described in U.S. Provisional Application Ser. No. 63/045,932 filed Jun. 30, 2020. In this case, some embodiments herein generally exploit one or more features (i.e., one or more cell characteristics) for use with machine learning techniques for detection of false cells. Where the cell characteristic is RSRP, RSRQ, or cell identifiers, for example, use of the one or more features may be based on (a) spatial relationship between RSRPs and/or RSRQs of cells, (b) spatial relationship between identifiers of cells, and/or (c) temporal relationship between RSRPs and/or RSRQs of neighboring cells. Regardless, some embodiments provide an end-to-end machine learning pipeline, which uses signal information to detect false cells adaptively. By adaptively, it is meant that, based on operating conditions of the network in a certain geographical area, some embodiments can tune themselves to identify false cells.

Note though anomaly detection using this approach may be complementary to other components that would identify anomalies that do not require machine learning, such as detection of a cell identity previously unseen for a given serving cell, or identification of duplicate cell identities.

Some embodiments herein may accordingly reduce dataset feature dimensionality in the context of machine learning while also increasing discriminatory power. Some embodiments may therefore provide improved accuracy, precision, and recall for machine learning applications based on features extract from measurement reports. Alternatively or additionally, some embodiments provide a reduced footprint in terms of memory and compute time due to the lower dimensionality of the feature space. The greater the number of features from each cell considered (such as in addition to RSRP, RSRQ, and PCI are also considered), the higher is the dimensionality reduction to be achieved.

Note that some embodiments for RSRP and RSRQ and RSSI exemplified cell characteristics that may be appropriately modelled through regression. The trained model in such a case may be any type of regressor model, including for instance Linear regression, Clustered Linear regression, Clustered regression, AdaBoost, Random Forest regression, Neural Networks, Support Vector Regression, Decision Trees etc. Indeed, any of these types of regressor models may be used to determine if predicted y (RSRP/RSRQ/RSSI) differs significantly with observed y (RSRP/RSRQ/RSSI). No matter the particular type, though, such a model may be used to predict a value with input from the sample dataset. If the predicted value differs significantly from the value in sample dataset, then an anomaly may be flagged.

Other embodiments may exploit a rule-based model. In such a case, the trained model may comprise rules (e.g., thresholds) against which to check the sample dataset. A rule may for instance specify that the RSRP value for a certain PCI should always be less than X, or the RSRQ value for a neighboring cell with a certain PCI should always be less than the RSRQ value for the serving cell's PCI. If these checks are not met, then an anomaly may be flagged.

Other cell characteristics may be more appropriately modeled through classification. In such a case, the trained model may be a single-class or multi-class classification model. The model in such a case may be used to predict a class value from the sample dataset. If the predicted class value differs from the class value in the sample dataset, then an anomaly may be flagged.

Consider now an example showing the performance of some embodiments herein for detecting a false cell from the RSRP of neighboring cells in an RRC measurement report.

A vast bulk of data considered in this example comes from a live operator network. To simulate how training data collection could be automated in a real application scenario, data is used from a number of days to train the model and then the model performance is tested on the data from a later date. The data originally consists of all the measurement reports arriving at the serving cell to be modelled within the given training data time frame.

The type of anomalies being searched for here is the type that is actively seeking to blend in with the live network, e.g., it uses one of the persistently appearing PCIs in the vicinity of the serving cell. If the false cell were to use a PCI rarely occurring as a neighbor for a certain area it may be possible to detect it simply by observing increased occurrence of that PCI in measurement reports to the surrounding serving cells (with the extreme case of using a PCI previously unseen for a given serving cell). For this reason, this example is restricted to the case where the data contains persistently occurring neighboring cells. Some embodiments exploit this persistency by using the connection management (CM) data and extracting the relative location of the registered neighboring cell location corresponding to the PCI in the measurement report.

In the absence of data from known false cells, some records in the test set are modified to mimic the presence of a false cell. This example considers and creates anomaly datasets with two variations for the false cell presence.

In the first case, the example considers the case where the measurement reporting system on the wireless device side somehow eliminates the duplicate PCI and only keeps the PCI with the strongest signal. To mimic this, the example chooses a record in the test set at random and then augments one of the neighboring RSRP-values to something significantly higher than the existing value. To mimic false cell activity for a certain time interval, the example augments all records with a similar profile of RSRP values for the same PCIs within the given time frame. This should correspond to a false cell being active in roughly the same location for this time interval.

In the second case, the example instead considers that the false cell controller chooses a PCI that is among the persistent neighbors of the serving cell but not existing in the particular test record chosen at random (due to operating in an area different than the legitimate cell having that PCI). To mimic this, the example instead adds a new RSRP-value of approximately the same magnitude as one of the other neighbors in the first report. Again, to mimic the FBS being active for a certain time interval, the new RSRP-value is also added to all other records with a similar collection of serving call and neighboring RSRP values.

Note that there could have been an actual false cell in the benign data. If so, it would either show up as false positives in the test results (if detected) or not be detected. Each dataset in Table 1 below consists of a number of hours of data from 5 days of training data with testing data on the corresponding hours for the next day after training.

TABLE 1

Details of synthetic anomaly data

| | Type | # hours | Dimensions (New/Sparse) | # train samples | # test samples | # anomalies in test |
|---|---|---|---|---|---|---|
| Set A1 | 1 | 1 | 11/29 | 4726 | 320 | 6 |
| Set A2 | 1 | 1 | 11/29 | 5231 | 442 | 12 |
| Set A3 | 1 | 1 | 11/33 | 5347 | 465 | 41 |
| Set B1 | 2 | 1 | 11/29 | 4888 | 527 | 49 |
| Set B2 | 2 | 1 | 11/33 | 5117 | 460 | 23 |
| Set B3 | 2 | 1 | 11/35 | 6945 | 802 | 105 |
| Set C1 | 1 | 4 | 16/35 | 22086 | 1466 | 48 |
| Set D1 | 2 | 4 | 16/35 | 20331 | 2168 | 240 |
| Set D2 | 2 | 4 | 16/35 | 10820 | 2016 | 150 |

To demonstrate the strength of feature extraction according to some embodiments, results are presented from different machine learning models trained on both the original sparse feature matrix as well as on the reduced set of extracted features. In all cases, the experiments are conducted in a novelty detection manner, and the anomalies are only added to the test set, assuming a one-class training set.

Consider now some of the different machine learning models used in this example. Anomaly Detection Forest (ADF) is a tree-based algorithm for novelty detection. The model has proven capable of creating trees that capture the behavior of normal training data while being sensitive to unseen feature combinations. Each tree consists of nodes with a feature as well as a decision boundary. The trees are created such that some leaves are created without observing any samples for that feature value during training. This implies that if a sample passed through the tree ends up in a such an empty leaf during testing, it is located in a part of input space that did not contain any training samples. Thus, the path length of a sample passed through the tree during testing can be used to obtain a value to quantify how unexpected the sample was.

Regularized Cycle-consistent Generative Adversarial Network (RCGAN) is a neural network architecture consisting of a generator, encoder, and discriminators which are jointly trained. Like autoencoders, the encoder in combination with the generator defines a mapping from an input sample back to itself, which is referred to as reconstruction. The aim is that this mapping should be able to map samples from the training distribution accurately, while the reconstruction of samples dissimilar to the samples in the training set should be imprecise. This way, an anomaly can be obtained as the norm of the reconstruction error (i.e., difference between input and reconstructed output). Typically, as RCGAN is a neural network architecture, it is more susceptible to overtraining issues and works better for larger datasets. For this reason, a slightly larger time window is used for the RCGAN experiments to gather a larger dataset.

Figure 9A:
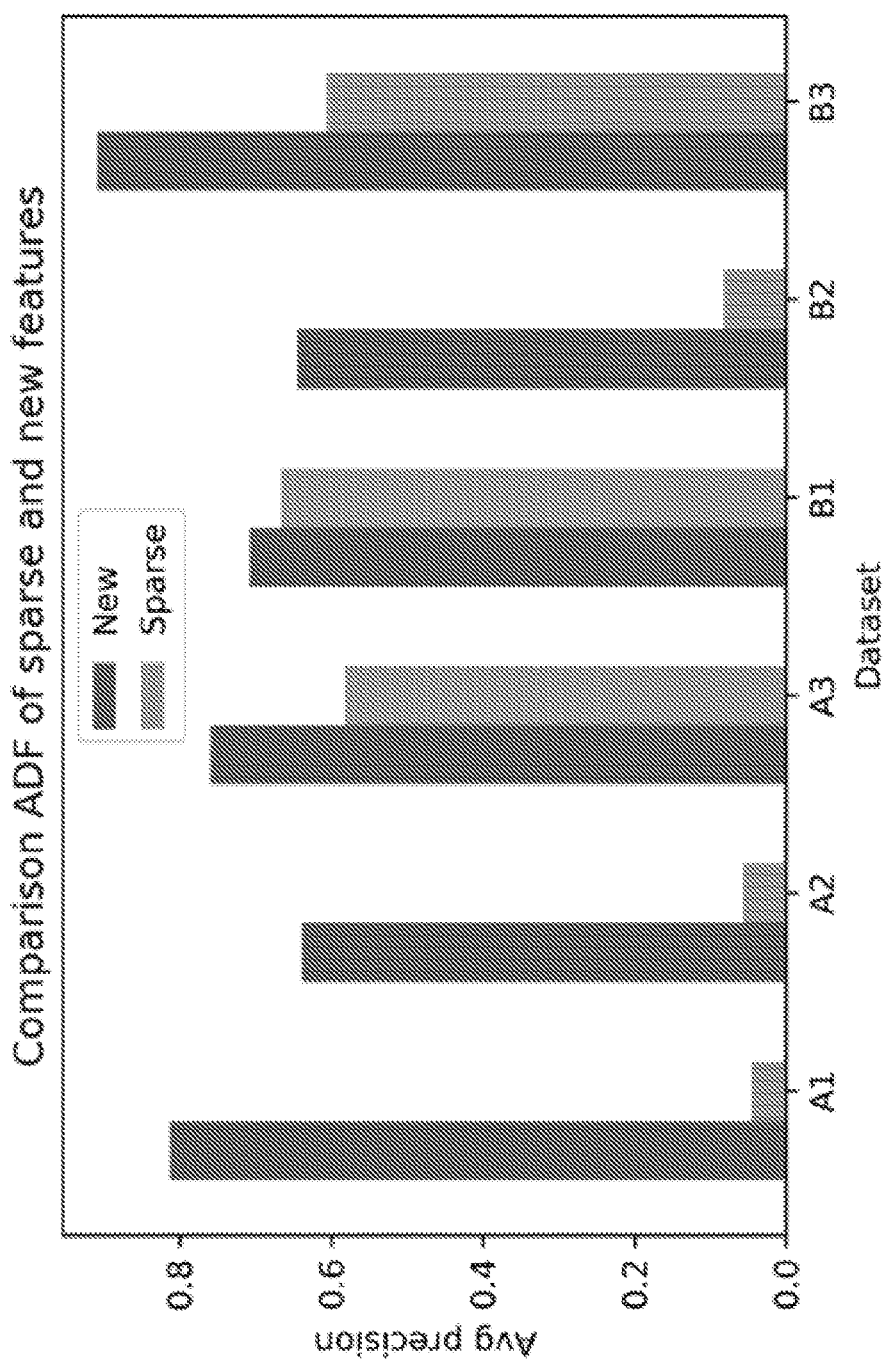
FIG. 9A and FIG. 9B show results of tests using average precision for different models using original sparse features versus using reduced features according to some embodiments.
Figure 9B:
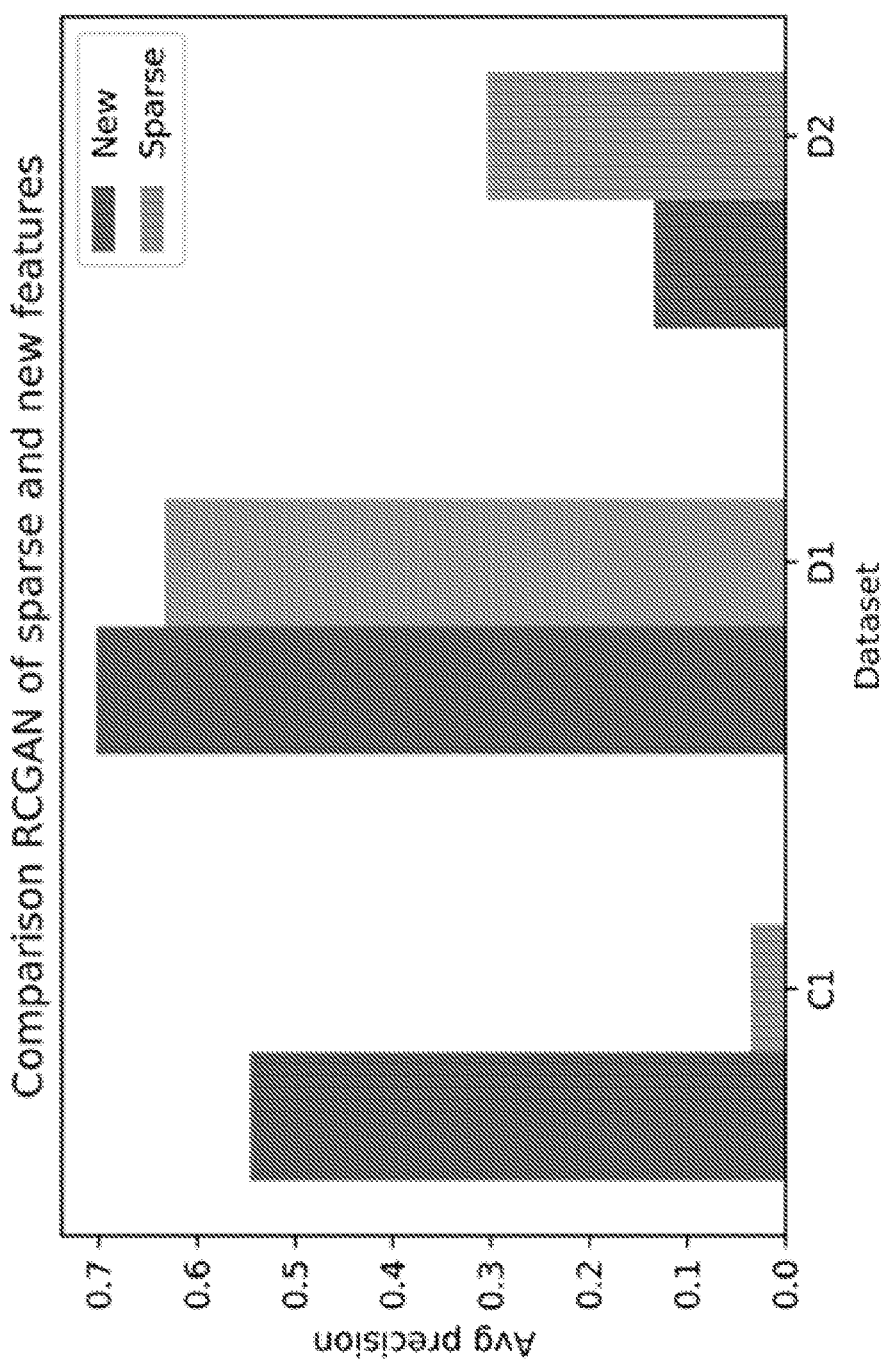

FIGS. 9A and 9B show the results of the tests using average precision (AUC for precision-recall curve) for different models using the original sparse features (Orange) versus using the reduced features according to embodiments herein (Blue). The results are presented for two completely different ML-models as described above. In these experiments, the new features were sorted by distance from the serving cell, and additional features included were X, Y, dRSRP, dRSRPp.

Note that the feature extraction equipment 22, model training equipment 30, and/or inference-making equipment 36 herein may be implemented separately or collectively by any equipment within the wireless communication network 10. In other embodiments, though, at least one of the feature extraction equipment 22, model training equipment 30, and inference-making equipment 36 herein may be implemented by equipment outside of the wireless communication network 10.

Consider one example now for implementing some embodiments in the context of an Open Radio Area Network (ORAN) architecture, e.g., in which different hardware and software functions (e.g., radio unit, distributed unit, central unit, platform, application) of a node are supplied by different vendors and integrated.

Figure 10A:
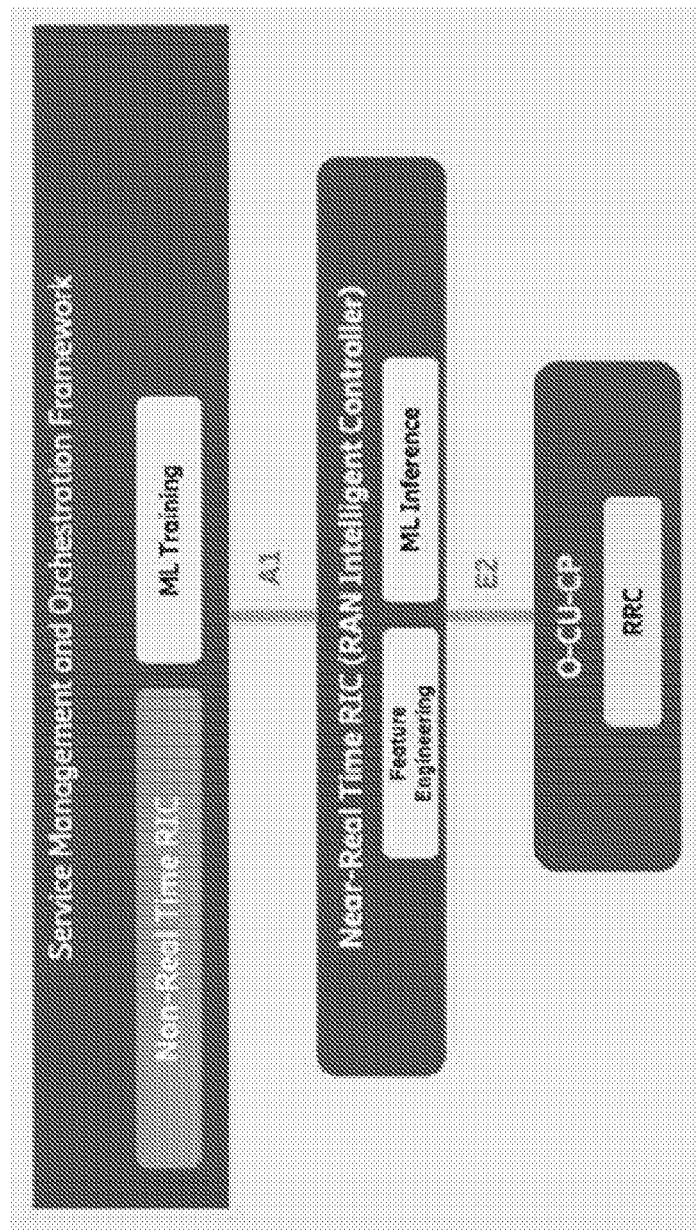
FIG. 10A shows some embodiments that use radio resource control (RRC) measurement report data and connection management (CM) data.

In one of the embodiments, shown in FIG. 10A, some embodiments take RRC measurement report data and the CM data from O-CU-CP via the E2 interface. Machine learning features will be extracted according to embodiments herein in Near-Real Time RIC in the "Feature Engineering" module. For the ML model training task, the features will be shared with the Service Management and Orchestration (SMO) Framework via A1 the interface where training module "ML Training" will use them for training. For the ML inference task, the features will be used by "ML Inference" module in Near-Real Time RIC for detection of a false cell.

Figure 10B:
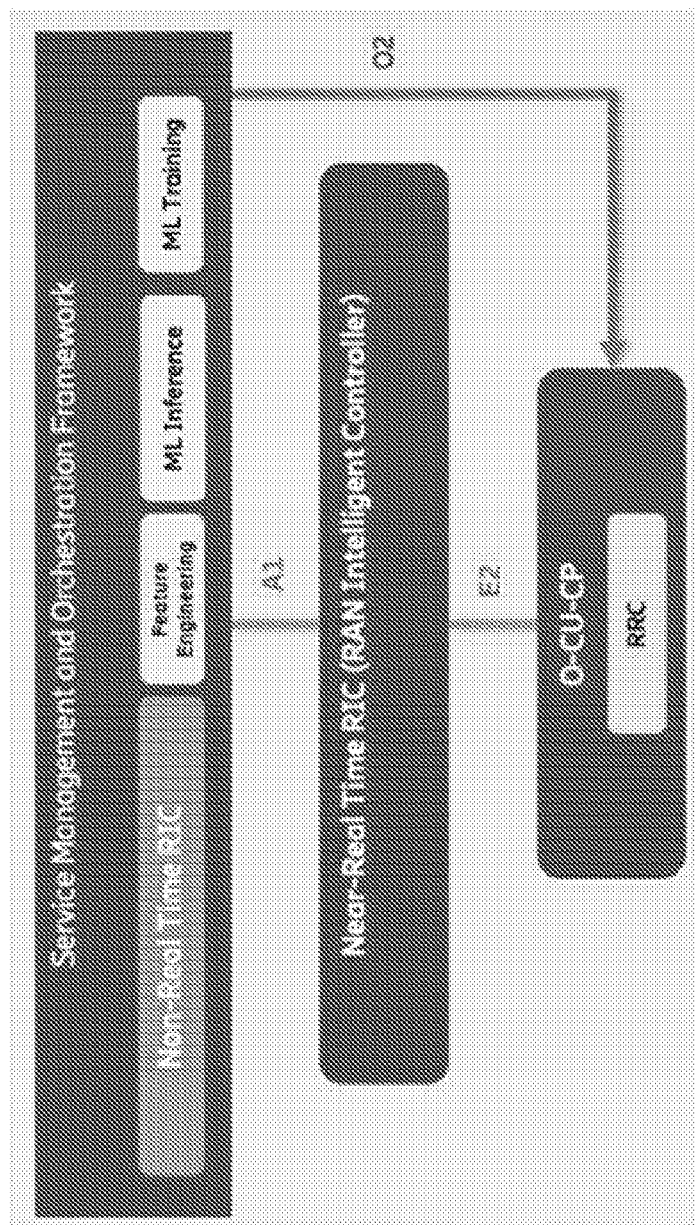
FIG. 10B shows three modules, including Feature Engineering, machine learning (ML) Training and ML Inference modules.

In another embodiment, shown in FIG. 10B, all of the three modules namely Feature Engineering, ML Training and ML Inference will reside in Non-Real Time RIC in SMO. In this embodiment, data from O-CU-CP can be read directly by Non-Real Time RIC via O2 interface. Alternatively, if the RRC measurement data is already read by Near-Real Time RIC via E2 interface from O-CU-CP for some other tasks, then it can be read via A1 interface by Non-Real Time RIC. The training and inference will work similar as explained for FIG. 10A above.

Note of course that only mention components of ORAN reference architecture (FIG. 1 in "Anomaly Detection Forest" by Sternby et al.) that are relevant to embodiments herein are described.

Figure 11:
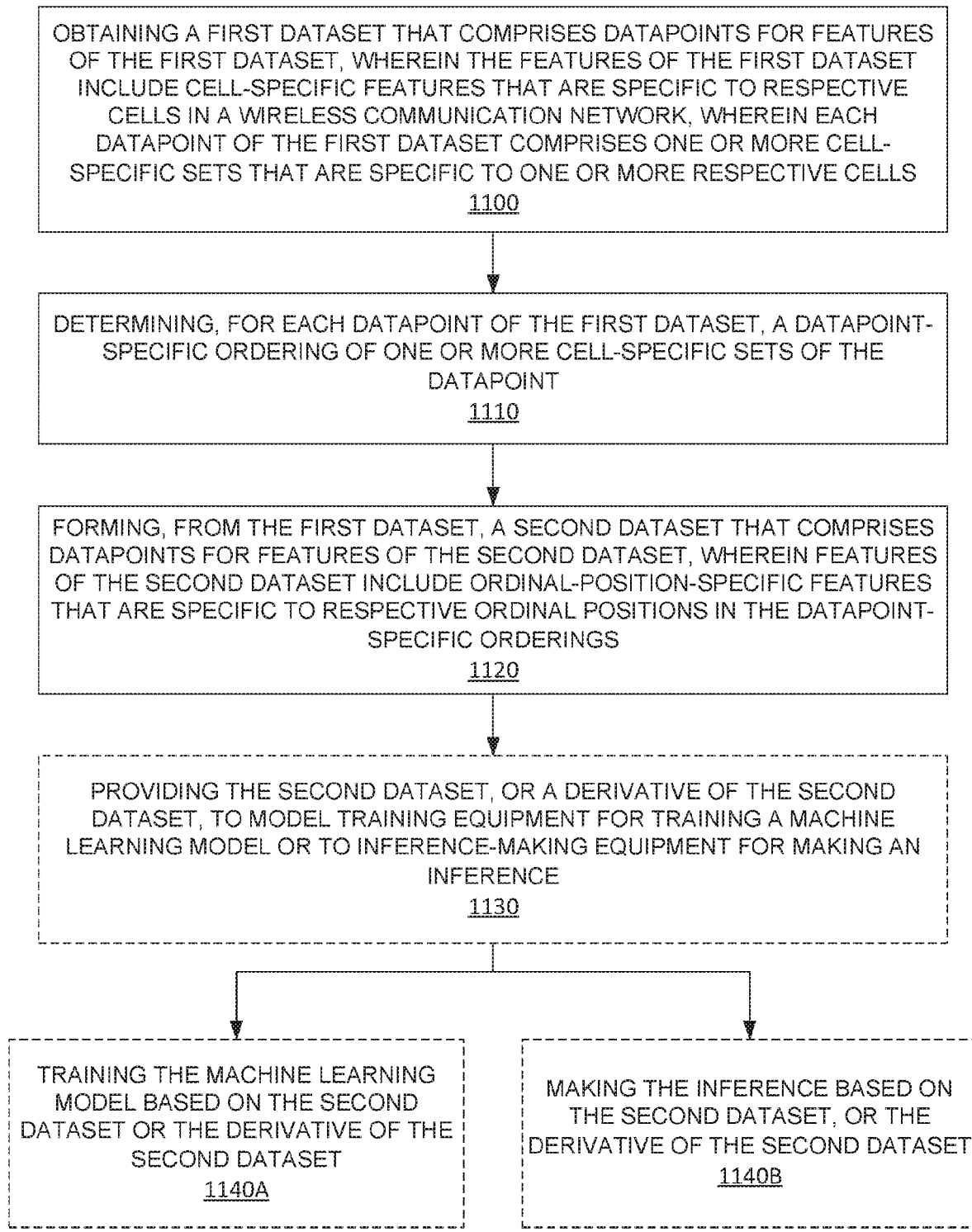
FIG. 11 shows a method in accordance with some embodiments.

In view of the above modifications and variations, FIG. 11 depicts a method in accordance with particular embodiments. The method is performed by at least feature engineering equipment 22. As shown, the method comprises obtaining a first dataset that 20-1 comprises datapoints DP1, DP2, and DP3 for features F1-F8 of the first dataset 20-1 (Block 110). The features F1-F8 of the first dataset 20-1 include cell-specific features that are specific to respective cells 14-1, 14-2, and 14-3 in a wireless communication network 10. Each datapoint DP1, DP2 and DP3 of the first dataset 20-1 comprises one or more cell-specific sets S1, S2, S3 that are specific to one or more respective cells 14-1, 14-2, 14-3. In some embodiments, each cell-specific set S1, S2, S3 includes one or more values for one or more respective cell-specific features that are specific to the same cell.

The method as shown also comprises determining, for each datapoint DP1, DP2, and DP3 of the first dataset 20-1, a datapoint-specific ordering O1, O2, O3 of one or more cell-specific sets of the datapoint (Block 1110).

The method further comprises forming, from the first dataset 20-1, a second dataset 20-2 that comprises datapoints DP1, DP2, DP3 for features of the second dataset 20-2 (Block 1120). Features of the second dataset 20-2 include ordinal-position-specific features that are specific to respective ordinal positions P1, P2 in the datapoint-specific orderings O1, O2, O3.

In some embodiments, the method also comprises providing the second dataset 20-2, or a derivative 20-3 of the second dataset 20-2, to model training equipment 30 for training a machine learning model or to inference-making equipment 36 for making an inference 40 (Block 1130).

In one or more embodiments, the method is also performed by the model training equipment 30. In this case, the method may further comprise training the machine learning model based on the second dataset 20-2 or the derivative 20-3 of the second dataset 20-2 (Block 1140A). Alternatively or additionally, the method may also be performed by the inference-making equipment 36. In this case, the method may further comprise making the inference 40 using the second dataset 20-2 or the derivative 20-3 (Block 1140B). For example, the method may comprise making an inference about whether an anomaly is present in a sample dataset based on an extent to which the sample dataset differs from a training dataset according to a trained machine learning model.

Additional aspects of the method in FIG. 11 are enumerated in the EMBODIMENTS section herein.

Embodiments herein also include corresponding apparatuses. Embodiments herein for instance include equipment 22, 30, and/or 36 configured to perform any of the steps of any of the embodiments described above.

Embodiments also include equipment 22, 30, and/or 36 comprising processing circuitry and power supply circuitry. The processing circuitry is configured to perform any of the steps of any of the embodiments described above for the equipment 22, 30, and/or 36. The power supply circuitry is configured to supply power to the equipment 22, 30, and/or 36.

Embodiments further include equipment 22, 30, and/or 36 comprising processing circuitry. The processing circuitry is configured to perform any of the steps of any of the embodiments described above for the equipment 22, 30, and/or 36. In some embodiments, the equipment 22, 30, and/or 36 further comprises communication circuitry.

Embodiments further include equipment 22, 30, and/or 36 comprising processing circuitry and memory. The memory contains instructions executable by the processing circuitry whereby the equipment 22, 30, and/or 36 is configured to perform any of the steps of any of the embodiments described above for the equipment 22, 30, and/or 36.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 12:
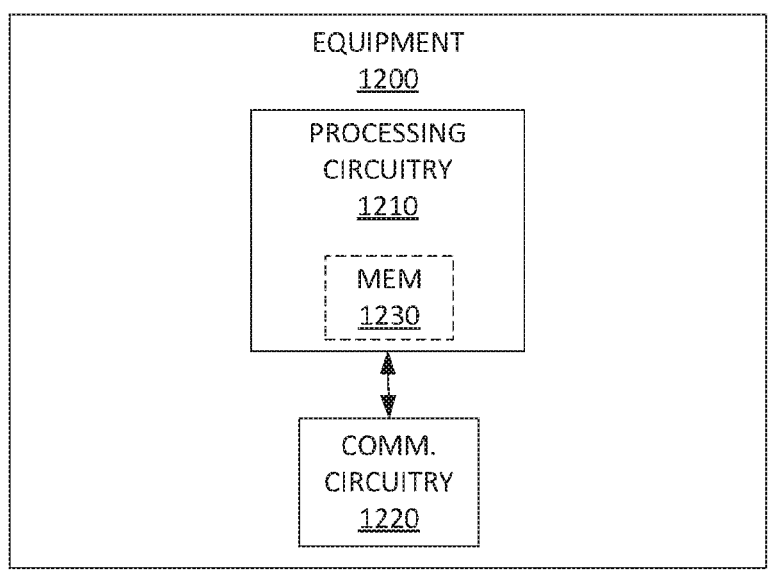
FIG. 12 illustrates equipment as implemented in accordance with one or more embodiments.

FIG. 12 for example illustrates equipment 1200 as implemented in accordance with one or more embodiments. The equipment 1200 may exemplify equipment 22, 30, and/or 36. As shown, the equipment 1200 includes processing circuitry 1210 and communication circuitry 1220. The communication circuitry 1220 is configured to transmit and/or receive information to and/or from one or more other nodes, e.g., via any communication technology. The processing circuitry 1210 is configured to perform processing described above, e.g., in FIG. 11, such as by executing instructions stored in memory 1230. The processing circuitry 1210 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Figure 13:
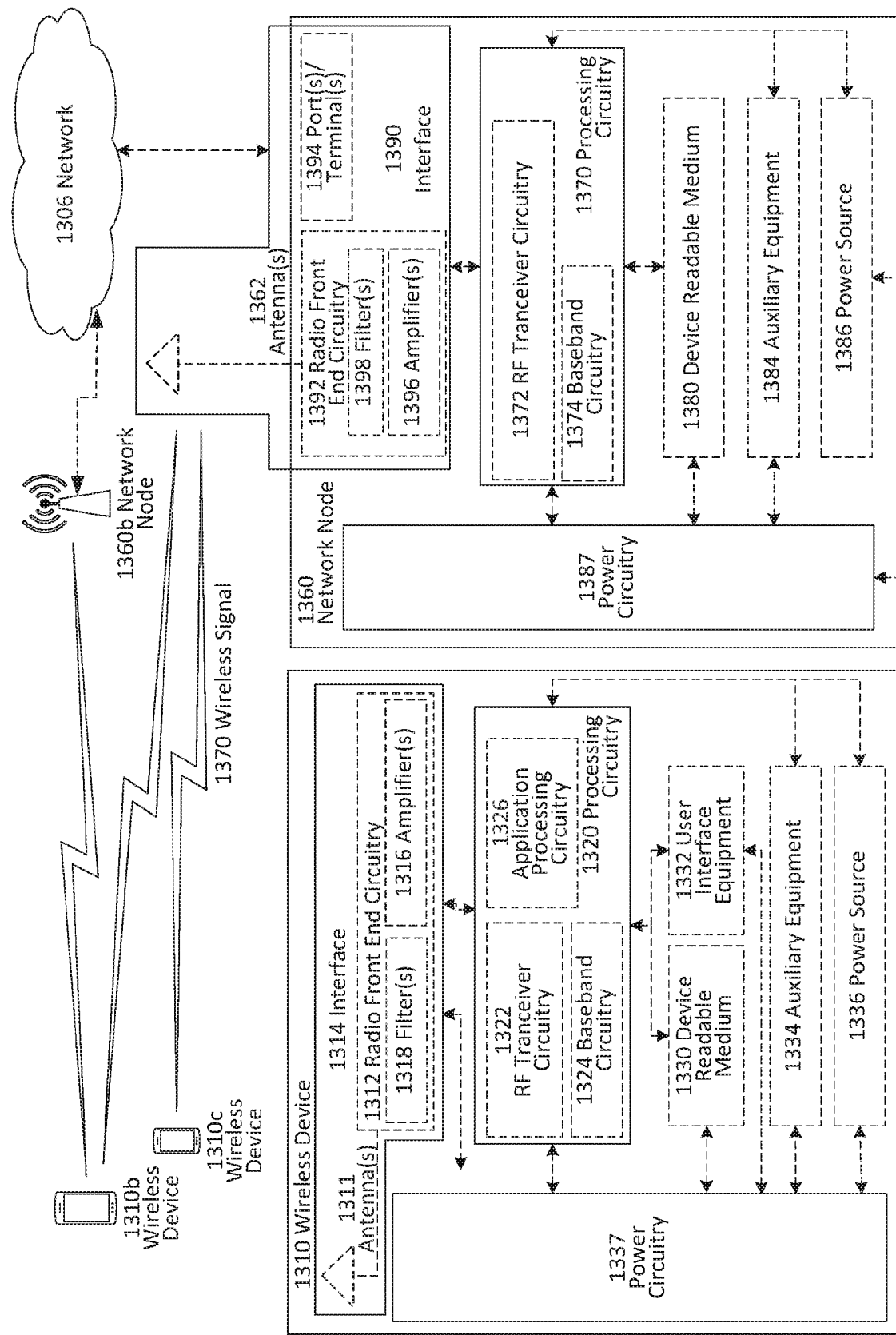
FIG. 13 illustrates example wireless network that the embodiments disclosed herein are described in relation to a wireless network.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network 1306, network nodes 1360 and 1360b, and WDs 1310, 1310b, and 1310c. In practice, a wireless network may further include any additional elements suitable to support communication between wireless devices or between a wireless device and another communication device, such as a landline telephone, a service provider, or any other network node or end device. Of the illustrated components, network node 1360 and wireless device (WD) 1310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1360 and WD 1310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 1360 includes processing circuitry 1370, device readable medium 1380, interface 1390, auxiliary equipment 1384, power source 1386, power circuitry 1387, and antenna 1362. Although network node 1360 illustrated in the example wireless network of FIG. 13 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1360 are depicted as single boxes located within a larger box, or nested within multiple boxes, in practice, a network node may comprise multiple different physical components that make up a single illustrated component (e.g., device readable medium 1380 may comprise multiple separate hard drives as well as multiple RAM modules).

Similarly, network node 1360 may be composed of multiple physically separate components (e.g., a NodeB component and a RNC component, or a BTS component and a BSC component, etc.), which may each have their own respective components. In certain scenarios in which network node 1360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1360 may be configured to support multiple radio access technologies (RATs). In such embodiments, some components may be duplicated (e.g., separate device readable medium 1380 for the different RATs) and some components may be reused (e.g., the same antenna 1362 may be shared by the RATs). Network node 1360 may also include multiple sets of the various illustrated components for different wireless technologies integrated into network node 1360, such as, for example, GSM, WCDMA, LTE, NR, WiFi, or Bluetooth wireless technologies. These wireless technologies may be integrated into the same or different chip or set of chips and other components within network node 1360.

Processing circuitry 1370 is configured to perform any determining, calculating, or similar operations (e.g., certain obtaining operations) described herein as being provided by a network node. These operations performed by processing circuitry 1370 may include processing information obtained by processing circuitry 1370 by, for example, converting the obtained information into other information, comparing the obtained information or converted information to information stored in the network node, and/or performing one or more operations based on the obtained information or converted information, and as a result of said processing making a determination.

Processing circuitry 1370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1360 components, such as device readable medium 1380, network node 1360 functionality. For example, processing circuitry 1370 may execute instructions stored in device readable medium 1380 or in memory within processing circuitry 1370. Such functionality may include providing any of the various wireless features, functions, or benefits discussed herein. In some embodiments, processing circuitry 1370 may include a system on a chip (SOC).

In some embodiments, processing circuitry 1370 may include one or more of radio frequency (RF) transceiver circuitry 1372 and baseband processing circuitry 1374. In some embodiments, radio frequency (RF) transceiver circuitry 1372 and baseband processing circuitry 1374 may be on separate chips (or sets of chips), boards, or units, such as radio units and digital units. In alternative embodiments, part or all of RF transceiver circuitry 1372 and baseband processing circuitry 1374 may be on the same chip or set of chips, boards, or units In certain embodiments, some or all of the functionality described herein as being provided by a network node, base station, eNB or other such network device may be performed by processing circuitry 1370 executing instructions stored on device readable medium 1380 or memory within processing circuitry 1370. In alternative embodiments, some or all of the functionality may be provided by processing circuitry 1370 without executing instructions stored on a separate or discrete device readable medium, such as in a hard-wired manner. In any of those embodiments, whether executing instructions stored on a device readable storage medium or not, processing circuitry 1370 can be configured to perform the described functionality. The benefits provided by such functionality are not limited to processing circuitry 1370 alone or to other components of network node 1360, but are enjoyed by network node 1360 as a whole, and/or by end users and the wireless network generally.

Device readable medium 1380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1370. Device readable medium 1380 may store any suitable instructions, data or information, including a computer program, software, an application including one or more of logic, rules, code, tables, etc. and/or other instructions capable of being executed by processing circuitry 1370 and, utilized by network node 1360. Device readable medium 1380 may be used to store any calculations made by processing circuitry 1370 and/or any data received via interface 1390. In some embodiments, processing circuitry 1370 and device readable medium 1380 may be considered to be integrated.

Interface 1390 is used in the wired or wireless communication of signalling and/or data between network node 1360, network 1306, and/or WDs 1310. As illustrated, interface 1390 comprises port(s)/terminal(s) 1394 to send and receive data, for example to and from network 1306 over a wired connection. Interface 1390 also includes radio front end circuitry 1392 that may be coupled to, or in certain embodiments a part of, antenna 1362. Radio front end circuitry 1392 comprises filters 1398 and amplifiers 1396. Radio front end circuitry 1392 may be connected to antenna 1362 and processing circuitry 1370. Radio front end circuitry may be configured to condition signals communicated between antenna 1362 and processing circuitry 1370. Radio front end circuitry 1392 may receive digital data that is to be sent out to other network nodes or WDs via a wireless connection. Radio front end circuitry 1392 may convert the digital data into a radio signal having the appropriate channel and bandwidth parameters using a combination of filters 1398 and/or amplifiers 1396. The radio signal may then be transmitted via antenna 1362. Similarly, when receiving data, antenna 1362 may collect radio signals which are then converted into digital data by radio front end circuitry 1392. The digital data may be passed to processing circuitry 1370. In other embodiments, the interface may comprise different components and/or different combinations of components.

In certain alternative embodiments, network node 1360 may not include separate radio front end circuitry 1392, instead, processing circuitry 1370 may comprise radio front end circuitry and may be connected to antenna 1362 without separate radio front end circuitry 1392. Similarly, in some embodiments, all or some of RF transceiver circuitry 1372 may be considered a part of interface 1390. In still other embodiments, interface 1390 may include one or more ports or terminals 1394, radio front end circuitry 1392, and RF transceiver circuitry 1372, as part of a radio unit (not shown), and interface 1390 may communicate with baseband processing circuitry 1374, which is part of a digital unit (not shown).

Antenna 1362 may include one or more antennas, or antenna arrays, configured to send and/or receive wireless signals. Antenna 1362 may be coupled to radio front end circuitry 1390 and may be any type of antenna capable of transmitting and receiving data and/or signals wirelessly. In some embodiments, antenna 1362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1362 may be separate from network node 1360 and may be connectable to network node 1360 through an interface or port.

Antenna 1362, interface 1390, and/or processing circuitry 1370 may be configured to perform any receiving operations and/or certain obtaining operations described herein as being performed by a network node. Any information, data and/or signals may be received from a wireless device, another network node and/or any other network equipment. Similarly, antenna 1362, interface 1390, and/or processing circuitry 1370 may be configured to perform any transmitting operations described herein as being performed by a network node. Any information, data and/or signals may be transmitted to a wireless device, another network node and/or any other network equipment.

Power circuitry 1387 may comprise, or be coupled to, power management circuitry and is configured to supply the components of network node 1360 with power for performing the functionality described herein. Power circuitry 1387 may receive power from power source 1386. Power source 1386 and/or power circuitry 1387 may be configured to provide power to the various components of network node 1360 in a form suitable for the respective components (e.g., at a voltage and current level needed for each respective component). Power source 1386 may either be included in, or external to, power circuitry 1387 and/or network node 1360. For example, network node 1360 may be connectable to an external power source (e.g., an electricity outlet) via an input circuitry or interface such as an electrical cable, whereby the external power source supplies power to power circuitry 1387. As a further example, power source 1386 may comprise a source of power in the form of a battery or battery pack which is connected to, or integrated in, power circuitry 1387. The battery may provide backup power should the external power source fail. Other types of power sources, such as photovoltaic devices, may also be used.

Alternative embodiments of network node 1360 may include additional components beyond those shown in FIG. 13 that may be responsible for providing certain aspects of the network node's functionality, including any of the functionality described herein and/or any functionality necessary to support the subject matter described herein. For example, network node 1360 may include user interface equipment to allow input of information into network node 1360 and to allow output of information from network node 1360. This may allow a user to perform diagnostic, maintenance, repair, and other administrative functions for network node 1360.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1310 includes antenna 1311, interface 1314, processing circuitry 1320, device readable medium 1330, user interface equipment 1332, auxiliary equipment 1334, power source 1336 and power circuitry 1337. WD 1310 may include multiple sets of one or more of the illustrated components for different wireless technologies supported by WD 1310, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1310.

Antenna 1311 may include one or more antennas or antenna arrays, configured to send and/or receive wireless signals, and is connected to interface 1314. In certain alternative embodiments, antenna 1311 may be separate from WD 1310 and be connectable to WD 1310 through an interface or port. Antenna 1311, interface 1314, and/or processing circuitry 1320 may be configured to perform any receiving or transmitting operations described herein as being performed by a WD. Any information, data and/or signals may be received from a network node and/or another WD. In some embodiments, radio front end circuitry and/or antenna 1311 may be considered an interface.

As illustrated, interface 1314 comprises radio front end circuitry 1312 and antenna 1311. Radio front end circuitry 1312 comprise one or more filters 1318 and amplifiers 1316. Radio front end circuitry 1314 is connected to antenna 1311 and processing circuitry 1320, and is configured to condition signals communicated between antenna 1311 and processing circuitry 1320. Radio front end circuitry 1312 may be coupled to or a part of antenna 1311. In some embodiments, WD 1310 may not include separate radio front end circuitry 1312; rather, processing circuitry 1320 may comprise radio front end circuitry and may be connected to antenna 1311. Similarly, in some embodiments, some or all of RF transceiver circuitry 1322 may be considered a part of interface 1314. Radio front end circuitry 1312 may receive digital data that is to be sent out to other network nodes or WDs via a wireless connection. Radio front end circuitry 1312 may convert the digital data into a radio signal having the appropriate channel and bandwidth parameters using a combination of filters 1318 and/or amplifiers 1316. The radio signal may then be transmitted via antenna 1311. Similarly, when receiving data, antenna 1311 may collect radio signals which are then converted into digital data by radio front end circuitry 1312. The digital data may be passed to processing circuitry 1320. In other embodiments, the interface may comprise different components and/or different combinations of components.

Processing circuitry 1320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1310 components, such as device readable medium 1330, WD 1310 functionality. Such functionality may include providing any of the various wireless features or benefits discussed herein. For example, processing circuitry 1320 may execute instructions stored in device readable medium 1330 or in memory within processing circuitry 1320 to provide the functionality disclosed herein.

As illustrated, processing circuitry 1320 includes one or more of RF transceiver circuitry 1322, baseband processing circuitry 1324, and application processing circuitry 1326. In other embodiments, the processing circuitry may comprise different components and/or different combinations of components. In certain embodiments processing circuitry 1320 of WD 1310 may comprise a SOC. In some embodiments, RF transceiver circuitry 1322, baseband processing circuitry 1324, and application processing circuitry 1326 may be on separate chips or sets of chips. In alternative embodiments, part or all of baseband processing circuitry 1324 and application processing circuitry 1326 may be combined into one chip or set of chips, and RF transceiver circuitry 1322 may be on a separate chip or set of chips. In still alternative embodiments, part or all of RF transceiver circuitry 1322 and baseband processing circuitry 1324 may be on the same chip or set of chips, and application processing circuitry 1326 may be on a separate chip or set of chips. In yet other alternative embodiments, part or all of RF transceiver circuitry 1322, baseband processing circuitry 1324, and application processing circuitry 1326 may be combined in the same chip or set of chips. In some embodiments, RF transceiver circuitry 1322 may be a part of interface 1314. RF transceiver circuitry 1322 may condition RF signals for processing circuitry 1320.

In certain embodiments, some or all of the functionality described herein as being performed by a WD may be provided by processing circuitry 1320 executing instructions stored on device readable medium 1330, which in certain embodiments may be a computer-readable storage medium. In alternative embodiments, some or all of the functionality may be provided by processing circuitry 1320 without executing instructions stored on a separate or discrete device readable storage medium, such as in a hard-wired manner. In any of those particular embodiments, whether executing instructions stored on a device readable storage medium or not, processing circuitry 1320 can be configured to perform the described functionality. The benefits provided by such functionality are not limited to processing circuitry 1320 alone or to other components of WD 1310, but are enjoyed by WD 1310 as a whole, and/or by end users and the wireless network generally.

Processing circuitry 1320 may be configured to perform any determining, calculating, or similar operations (e.g., certain obtaining operations) described herein as being performed by a WD. These operations, as performed by processing circuitry 1320, may include processing information obtained by processing circuitry 1320 by, for example, converting the obtained information into other information, comparing the obtained information or converted information to information stored by WD 1310, and/or performing one or more operations based on the obtained information or converted information, and as a result of said processing making a determination.

Device readable medium 1330 may be operable to store a computer program, software, an application including one or more of logic, rules, code, tables, etc. and/or other instructions capable of being executed by processing circuitry 1320. Device readable medium 1330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1320. In some embodiments, processing circuitry 1320 and device readable medium 1330 may be considered to be integrated.

User interface equipment 1332 may provide components that allow for a human user to interact with WD 1310. Such interaction may be of many forms, such as visual, audial, tactile, etc. User interface equipment 1332 may be operable to produce output to the user and to allow the user to provide input to WD 1310. The type of interaction may vary depending on the type of user interface equipment 1332 installed in WD 1310. For example, if WD 1310 is a smart phone, the interaction may be via a touch screen; if WD 1310 is a smart meter, the interaction may be through a screen that provides usage (e.g., the number of gallons used) or a speaker that provides an audible alert (e.g., if smoke is detected). User interface equipment 1332 may include input interfaces, devices and circuits, and output interfaces, devices and circuits. User interface equipment 1332 is configured to allow input of information into WD 1310, and is connected to processing circuitry 1320 to allow processing circuitry 1320 to process the input information. User interface equipment 1332 may include, for example, a microphone, a proximity or other sensor, keys/buttons, a touch display, one or more cameras, a USB port, or other input circuitry. User interface equipment 1332 is also configured to allow output of information from WD 1310, and to allow processing circuitry 1320 to output information from WD 1310. User interface equipment 1332 may include, for example, a speaker, a display, vibrating circuitry, a USB port, a headphone interface, or other output circuitry. Using one or more input and output interfaces, devices, and circuits, of user interface equipment 1332, WD 1310 may communicate with end users and/or the wireless network, and allow them to benefit from the functionality described herein.

Auxiliary equipment 1334 is operable to provide more specific functionality which may not be generally performed by WDs. This may comprise specialized sensors for doing measurements for various purposes, interfaces for additional types of communication such as wired communications etc. The inclusion and type of components of auxiliary equipment 1334 may vary depending on the embodiment and/or scenario.

Power source 1336 may, in some embodiments, be in the form of a battery or battery pack. Other types of power sources, such as an external power source (e.g., an electricity outlet), photovoltaic devices or power cells, may also be used. WD 1310 may further comprise power circuitry 1337 for delivering power from power source 1336 to the various parts of WD 1310 which need power from power source 1336 to carry out any functionality described or indicated herein. Power circuitry 1337 may in certain embodiments comprise power management circuitry. Power circuitry 1337 may additionally or alternatively be operable to receive power from an external power source; in which case WD 1310 may be connectable to the external power source (such as an electricity outlet) via input circuitry or an interface such as an electrical power cable. Power circuitry 1337 may also in certain embodiments be operable to deliver power from an external power source to power source 1336. This may be, for example, for the charging of power source 1336. Power circuitry 1337 may perform any formatting, converting, or other modification to the power from power source 1336 to make the power suitable for the respective components of WD 1310 to which power is supplied.

Figure 14:
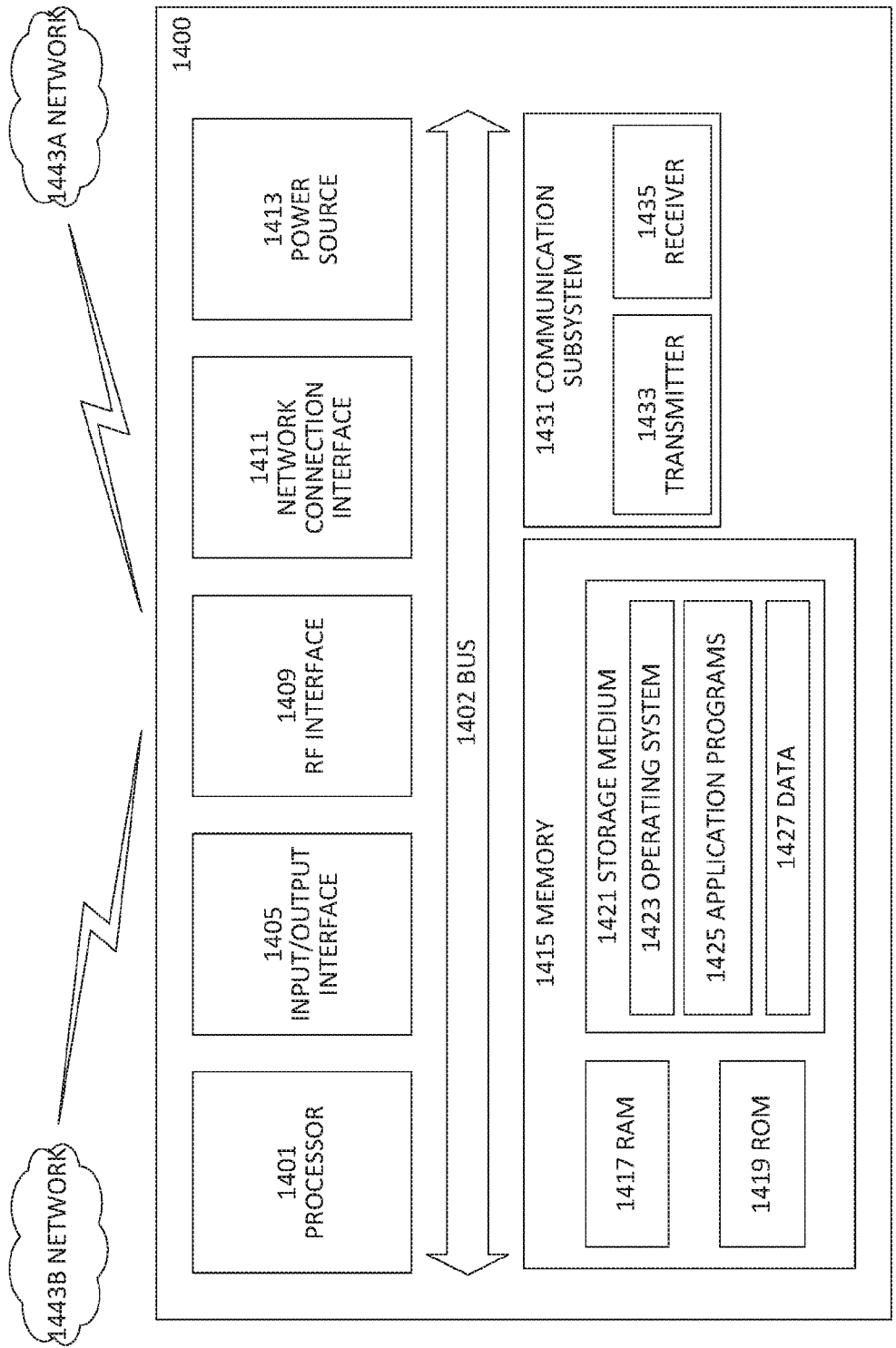
FIG. 14 illustrates one embodiment of a user equipment (UE) in accordance with some embodiments.

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 14200 may be any UE identified by the $3^{rd}$ Generation Partnership Project (3GPP), including a NB-IoT UE, a machine type communication (MTC) UE, and/or an enhanced MTC (eMTC) UE. UE 1400, as illustrated in FIG. 14, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE 1400 includes processing circuitry 1401 that is operatively coupled to input/output interface 1405, radio frequency (RF) interface 1409, network connection interface 1411, memory 1415 including random access memory (RAM) 1417, read-only memory (ROM) 1419, and storage medium 1421 or the like, communication subsystem 1431, power source 1433, and/or any other component, or any combination thereof. Storage medium 1421 includes operating system 1423, application program 1425, and data 1427. In other embodiments, storage medium 1421 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry 1401 may be configured to process computer instructions and data. Processing circuitry 1401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1401 may include two central processing units (CPUs). Data may be information in a form suitable for use by a computer.

In the depicted embodiment, input/output interface 1405 may be configured to provide a communication interface to an input device, output device, or input and output device. UE 1400 may be configured to use an output device via input/output interface 1405. An output device may use the same type of interface port as an input device. For example, a USB port may be used to provide input to and output from UE 1400. The output device may be a speaker, a sound card, a video card, a display, a monitor, a printer, an actuator, an emitter, a smartcard, another output device, or any combination thereof. UE 1400 may be configured to use an input device via input/output interface 1405 to allow a user to capture information into UE 1400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface 1409 may be configured to provide a communication interface to RF components such as a transmitter, a receiver, and an antenna. Network connection interface 1411 may be configured to provide a communication interface to network 1443a. Network 1443a may encompass wired and/or wireless networks such as a local-area network (LAN), a wide-area network (WAN), a computer network, a wireless network, a telecommunications network, another like network or any combination thereof. For example, network 1443a may comprise a Wi-Fi network. Network connection interface 1411 may be configured to include a receiver and a transmitter interface used to communicate with one or more other devices over a communication network according to one or more communication protocols, such as Ethernet, TCP/IP, SONET, ATM, or the like. Network connection interface 1411 may implement receiver and transmitter functionality appropriate to the communication network links (e.g., optical, electrical, and the like). The transmitter and receiver functions may share circuit components, software or firmware, or alternatively may be implemented separately.

RAM 1417 may be configured to interface via bus 1402 to processing circuitry 1401 to provide storage or caching of data or computer instructions during the execution of software programs such as the operating system, application programs, and device drivers. ROM 1419 may be configured to provide computer instructions or data to processing circuitry 1401. For example, ROM 1419 may be configured to store invariant low-level system code or data for basic system functions such as basic input and output (I/O), startup, or reception of keystrokes from a keyboard that are stored in a non-volatile memory. Storage medium 1421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1421 may be configured to include operating system 1423, application program 1425 such as a web browser application, a widget or gadget engine or another application, and data file 1427. Storage medium 1421 may store, for use by UE 1400, any of a variety of various operating systems or combinations of operating systems.

Storage medium 1421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1421 may allow UE 1400 to access computer-executable instructions, application programs or the like, stored on transitory or non-transitory memory media, to off-load data, or to upload data. An article of manufacture, such as one utilizing a communication system may be tangibly embodied in storage medium 1421, which may comprise a device readable medium.

In FIG. 14, processing circuitry 1401 may be configured to communicate with network 1443b using communication subsystem 1431. Network 1443a and network 1443b may be the same network or networks or different network or networks. Communication subsystem 1431 may be configured to include one or more transceivers used to communicate with network 1443b. For example, communication subsystem 1431 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1433 and/or receiver 1435 to implement transmitter or receiver functionality, respectively, appropriate to the RAN links (e.g., frequency allocations and the like). Further, transmitter 1433 and receiver 1435 of each transceiver may share circuit components, software or firmware, or alternatively may be implemented separately.

In the illustrated embodiment, the communication functions of communication subsystem 1431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1431 may include cellular communication, Wi-F1 communication, Bluetooth communication, and GPS communication. Network 1443b may encompass wired and/or wireless networks such as a local-area network (LAN), a wide-area network (WAN), a computer network, a wireless network, a telecommunications network, another like network or any combination thereof. For example, network 1443b may be a cellular network, a Wi-F1 network, and/or a near-field network. Power source 1413 may be configured to provide alternating current (AC) or direct current (DC) power to components of UE 1400.

The features, benefits and/or functions described herein may be implemented in one of the components of UE 1400 or partitioned across multiple components of UE 1400. Further, the features, benefits, and/or functions described herein may be implemented in any combination of hardware, software or firmware. In one example, communication subsystem 1431 may be configured to include any of the components described herein. Further, processing circuitry 1401 may be configured to communicate with any of such components over bus 1402. In another example, any of such components may be represented by program instructions stored in memory that when executed by processing circuitry 1401 perform the corresponding functions described herein. In another example, the functionality of any of such components may be partitioned between processing circuitry 1401 and communication subsystem 1431. In another example, the non-computationally intensive functions of any of such components may be implemented in software or firmware and the computationally intensive functions may be implemented in hardware.

In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1500 hosted by one or more of hardware nodes 1530. Further, in embodiments in which the virtual node is not a radio access node or does not require radio connectivity (e.g., a core network node), then the network node may be entirely virtualized.

The functions may be implemented by one or more applications 1520 (which may alternatively be called software instances, virtual appliances, network functions, virtual nodes, virtual network functions, etc.) operative to implement some of the features, functions, and/or benefits of some of the embodiments disclosed herein. Applications 1520 are run in virtualization environment 1500 which provides hardware 1530 comprising processing circuitry 1560 and memory 1590. Memory 1590 contains instructions 1595 executable by processing circuitry 1560 whereby application 1520 is operative to provide one or more of the features, benefits, and/or functions disclosed herein.

Virtualization environment 1500, comprises general-purpose or special-purpose network hardware devices 1530 comprising a set of one or more processors or processing circuitry 1560, which may be commercial off-the-shelf (COTS) processors, dedicated Application Specific Integrated Circuits (ASICs), or any other type of processing circuitry including digital or analog hardware components or special purpose processors. Each hardware device may comprise memory 1590-1 which may be non-persistent memory for temporarily storing instructions 1595 or software executed by processing circuitry 1560. Each hardware device may comprise one or more network interface controllers (NICs) 1570, also known as network interface cards, which include physical network interface 1580. Each hardware device may also include non-transitory, persistent, machine-readable storage media 1590-2 having stored therein software 1595 and/or instructions executable by processing circuitry 1560. Software 1595 may include any type of software including software for instantiating one or more virtualization layers 1550 (also referred to as hypervisors), software to execute virtual machines 1540 as well as software allowing it to execute functions, features and/or benefits described in relation with some embodiments described herein.

Virtual machines 1540, comprise virtual processing, virtual memory, virtual networking or interface and virtual storage, and may be run by a corresponding virtualization layer 1550 or hypervisor. Different embodiments of the instance of virtual appliance 1520 may be implemented on one or more of virtual machines 1540, and the implementations may be made in different ways.

During operation, processing circuitry 1560 executes software 1595 to instantiate the hypervisor or virtualization layer 1550, which may sometimes be referred to as a virtual machine monitor (VMM). Virtualization layer 1550 may present a virtual operating platform that appears like networking hardware to virtual machine 1540.

Figure 15:
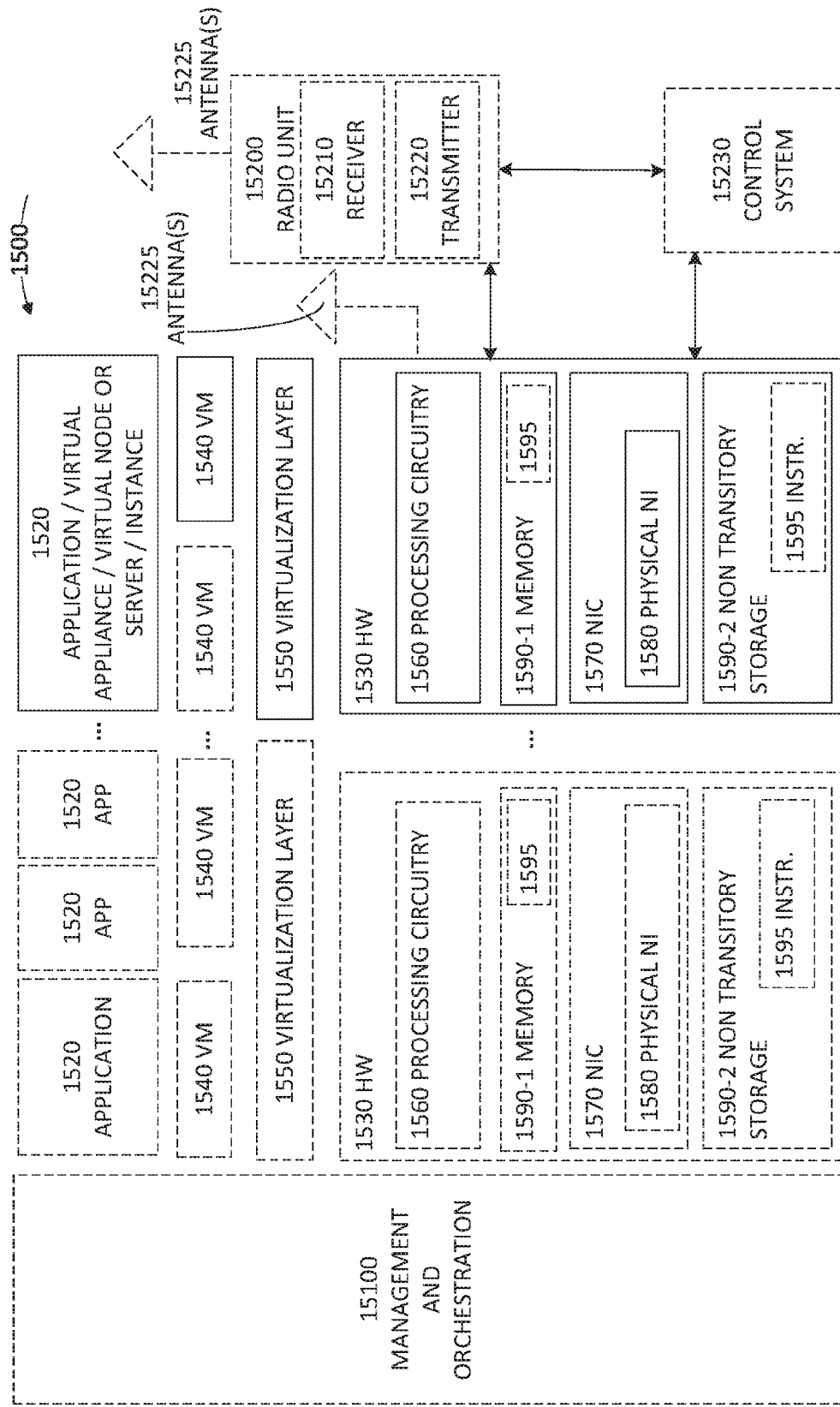
FIG. 15 is a schematic block diagram illustrating a virtualization environment in which functions implemented by some embodiments may be virtualized.

As shown in FIG. 15, hardware 1530 may be a standalone network node with generic or specific components. Hardware 1530 may comprise antenna 15225 and may implement some functions via virtualization. Alternatively, hardware 1530 may be part of a larger cluster of hardware (e.g. such as in a data center or customer premise equipment (CPE)) where many hardware nodes work together and are managed via management and orchestration (MANO) 15100, which, among others, oversees lifecycle management of applications 1520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1540 may be a software implementation of a physical machine that runs programs as if they were executing on a physical, non-virtualized machine. Each of virtual machines 1540, and that part of hardware 1530 that executes that virtual machine, be it hardware dedicated to that virtual machine and/or hardware shared by that virtual machine with others of the virtual machines 1540, forms a separate virtual network elements (VNE).

Still in the context of NFV, Virtual Network Function (VNF) is responsible for handling specific network functions that run in one or more virtual machines 1540 on top of hardware networking infrastructure 1530 and corresponds to application 1520 in FIG. 15.

In some embodiments, one or more radio units 15200 that each include one or more transmitters 15220 and one or more receivers 15210 may be coupled to one or more antennas 15225. Radio units 15200 may communicate directly with hardware nodes 1530 via one or more appropriate network interfaces and may be used in combination with the virtual components to provide a virtual node with radio capabilities, such as a radio access node or a base station.

In some embodiments, some signalling can be effected with the use of control system 15230 which may alternatively be used for communication between the hardware nodes 1530 and radio units 15200.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term "unit" may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The term "A and/or B" as used herein covers embodiments having A alone, B alone, or both A and B together. The term "A and/or B" may therefore equivalently mean "at least one of any one or more of A and B".

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The invention claimed is:

1. A method performed by feature engineering equipment, comprising:
   obtaining a first dataset that comprises datapoints for features of the first dataset, wherein the features of the first dataset include cell-specific features that are specific to respective cells in a wireless communication network, wherein each datapoint of the first dataset comprises one or more cell-specific sets that are specific to one or more respective cells, wherein each cell-specific set includes one or more values for one or more respective cell-specific features that are specific to the same cell;
   determining, for each datapoint of the first dataset, a datapoint-specific ordering of one or more cell-specific sets of the datapoint;
   forming, from the first dataset, a second dataset that comprises datapoints for features of the second dataset, wherein features of the second dataset include ordinal-position-specific features that are specific to respective ordinal positions in the datapoint-specific orderings; and
   providing the second dataset, or a derivative of the second dataset, to model training equipment for training a machine learning model or to inference-making equipment for making an inference.

2. The method of claim 1, wherein the datapoint-specific ordering determined for each respective datapoint of the first dataset orders one or more cell-specific sets of the datapoint based on a numerical ordering of the values included in the one or more cell-specific sets for a certain one of the cell-specific features.

3. The method of claim 1, wherein determining, for each datapoint of the first dataset, a datapoint-specific ordering of one or more cell-specific sets of the datapoint comprises, for each datapoint of the first dataset:

determining, for each of the one or more cell-specific sets to be ordered, a geographical distance between a reference cell and the cell to which the cell-specific set is specific; and determining the datapoint-specific ordering by ordering the one or more cell-specific sets in order of one or more geographical distances determined for the respective one or more cell-specific sets.

4. The method of claim 1, wherein the cell-specific features of the first dataset include first characteristic features and second characteristic features, wherein each first characteristic feature represents a first characteristic associated with a specific cell and each second characteristic feature represents a second characteristic associated with a specific cell, and wherein each cell-specific set includes respective values for a first characteristic feature and a second characteristic feature that are specific to the same cell.

5. The method of claim 1, wherein each datapoint of the second dataset comprises one or more ordinal-position-specific sets that are specific to one or more respective ordinal positions in the datapoint-specific orderings, wherein each ordinal-position-specific set includes one or more values for one or more respective ordinal-position-specific features that are specific to the same ordinal position in the datapoint-specific orderings.

6. The method of claim 5, wherein the cell-specific features of the first dataset include first characteristic cell-specific features and second characteristic cell-specific features, wherein each first characteristic cell-specific feature represents a first characteristic associated with a specific cell and each second characteristic cell-specific feature represents a second characteristic associated with a specific cell, wherein each cell-specific set includes respective values for a first characteristic cell-specific feature and a second characteristic cell-specific feature that are specific to the same cell, wherein the ordinal-position-specific features of the second dataset include first characteristic ordinal-position-specific features and second characteristic ordinal-position-specific features, wherein each first characteristic ordinal-position-specific feature represents the first characteristic associated with a specific ordinal position in the datapoint-specific orderings and each second characteristic ordinal-position-specific feature represents the second characteristic associated with a specific ordinal position in the datapoint-specific orderings, wherein each ordinal-position-specific set includes respective values for a first characteristic ordinal-position-specific feature and a second characteristic ordinal-position-specific feature that are specific to the same ordinal position.

7. The method of claim 4, wherein the first characteristic is signal strength and the second characteristic is signal quality.

8. The method of claim 1, wherein each ordinal-position-specific feature of the second dataset is formed from a combination of multiple cell-specific features of the first dataset.

9. The method of claim 1, wherein the number of ordinal-position-specific features of the second dataset is less than the number of cell-specific features of the first dataset.

10. The method of claim 9, wherein each cell-specific set includes K values for K respective cell-specific features that are specific to the same cell, wherein the first dataset includes D datapoints, wherein $J_d$ is the number of cell-specific sets comprised in datapoint d of the first dataset, wherein $J_{d,max}$ is the maximum $J_d$ across the D datapoints of the first dataset, and wherein the number of ordinal-position-specific features of the second dataset is greater than or equal to $K*J_{d,max}$.

11. Equipment comprising processing circuitry configured to:
obtain a first dataset that comprises datapoints for features of the first dataset, wherein the features of the first dataset include cell-specific features that are specific to respective cells in a wireless communication network, wherein each datapoint of the first dataset comprises one or more cell-specific sets that are specific to one or more respective cells, wherein each cell-specific set includes one or more values for one or more respective cell-specific features that are specific to the same cell;

determine, for each datapoint of the first dataset, a datapoint-specific ordering of one or more cell-specific sets of the datapoint;

form, from the first dataset, a second dataset that comprises datapoints for features of the second dataset, wherein features of the second dataset include ordinal-position-specific features that are specific to respective ordinal positions in the datapoint-specific orderings; and provide the second dataset, or a derivative of the second dataset, to model training equipment for training a machine learning model or to inference-making equipment for making an inference.

12. The equipment of claim 11, wherein the datapoint-specific ordering determined for each respective datapoint of the first dataset orders one or more cell-specific sets of the datapoint based on a numerical ordering of the values included in the one or more cell-specific sets for a certain one of the cell-specific features.

13. The equipment of claim 11, wherein determining, for each datapoint of the first dataset, a datapoint-specific ordering of one or more cell-specific sets of the datapoint comprises, for each datapoint of the first dataset:

determining, for each of the one or more cell-specific sets to be ordered, a geographical distance between a reference cell and the cell to which the cell-specific set is specific; and determining the datapoint-specific ordering by ordering the one or more cell-specific sets in order of one or more geographical distances determined for the respective one or more cell-specific sets.

14. The equipment of claim 1, wherein the cell-specific features of the first dataset include first characteristic features and second characteristic features, wherein each first characteristic feature represents a first characteristic associated with a specific cell and each second characteristic feature represents a second characteristic associated with a specific cell, and wherein each cell-specific set includes respective values for a first characteristic feature and a second characteristic feature that are specific to the same cell.

15. The equipment of claim 1, wherein each datapoint of the second dataset comprises one or more ordinal-position-specific sets that are specific to one or more respective ordinal positions in the datapoint-specific orderings, wherein each ordinal-position-specific set includes one or more values for one or more respective ordinal-position-specific features that are specific to the same ordinal position in the datapoint-specific orderings.

16. The equipment of claim 15, wherein the cell-specific features of the first dataset include first characteristic cell-specific features and second characteristic cell-specific features, wherein each first characteristic cell-specific feature represents a first characteristic associated with a specific cell and each second characteristic cell-specific feature represents a second characteristic associated with a specific cell, wherein each cell-specific set includes respective values for a first characteristic cell-specific feature and a second characteristic cell-specific feature that are specific to the same cell, wherein the ordinal-position-specific features of the second dataset include first characteristic ordinal-position-specific features and second characteristic ordinal-position-specific features, wherein each first characteristic ordinal-position-specific feature represents the first characteristic associated with a specific ordinal position in the datapoint-specific orderings and each second characteristic ordinal-position-specific feature represents the second characteristic associated with a specific ordinal position in the datapoint-specific orderings, wherein each ordinal-position-specific set includes respective values for a first characteristic ordinal-position-specific feature and a second characteristic ordinal-position-specific feature that are specific to the same ordinal position.

17. The equipment of claim 14, wherein the first characteristic is signal strength and the second characteristic is signal quality.

18. The equipment of claim 11, wherein each ordinal-position-specific feature of the second dataset is formed from a combination of multiple cell-specific features of the first dataset.

19. The equipment of claim 11, wherein the number of ordinal-position-specific features of the second dataset is less than the number of cell-specific features of the first dataset.

20. The equipment of claim 19, wherein each cell-specific set includes K values for K respective cell-specific features that are specific to the same cell, wherein the first dataset includes D datapoints, wherein $J_d$ is the number of cell-specific sets comprised in datapoint d of the first dataset, wherein $J_{d,max}$ is the maximum $J_d$ across the D datapoints of the first dataset, and wherein the number of ordinal-position-specific features of the second dataset is greater than or equal to $K*J_{d,max}$.

* * * * *